(12) United States Patent
Kim et al.

(10) Patent No.: US 10,708,021 B2
(45) Date of Patent: Jul. 7, 2020

(54) METHOD FOR TRANSMITTING SRS IN A WIRELESS COMMUNICATION SYSTEM AND APPARATUS THEREFOR

(71) Applicant: LG Electronics Inc., Seoul (KR)

(72) Inventors: Jaehyung Kim, Seoul (KR); Suckchel Yang, Seoul (KR); Seonwook Kim, Seoul (KR); Changhwan Park, Seoul (KR); Joonkui Ahn, Seoul (KR)

(73) Assignee: LG Electronics Inc., Seoul ( * ) Notice: Subject to any disclaimer, the term of this patent is extended or adjusted under 35 U.S.C. 154(b) by 0 days.

(21) Appl. No.: 16/100,926

(22) Filed: Aug. 10, 2018

(65) Prior Publication Data

US 2019/0109688 A1 Apr. 11, 2019

Related U.S. Application Data

(60) Provisional application No. 62/544,246, filed on Aug. 11, 2017.

(51) Int. Cl.
*H04L 5/00* (2006.01)
*H04L 5/14* (2006.01)
*H04W 74/08* (2009.01)

(52) U.S. Cl.
CPC ............ *H04L 5/0048* (2013.01); *H04L 5/001* (2013.01); *H04L 5/0012* (2013.01); *H04L 5/0082* (2013.01); *H04L 5/0094* (2013.01); *H04L 5/0096* (2013.01); *H04L 5/0098* (2013.01); *H04W 74/085* (2013.01); *H04W 74/0841* (2013.01); *H04W 74/0891* (2013.01); *H04L 5/0051* (2013.01); *H04L 5/14* (2013.01)

(58) Field of Classification Search
CPC ... H04L 5/0048; H04L 5/0012; H04L 5/0082; H04L 5/0098; H04L 5/001; H04W 74/0841; H04W 74/085; H04W 74/0891
See application file for complete search history.

(56) References Cited

U.S. PATENT DOCUMENTS

2018/0007707 A1* 1/2018 Rico Alvarino ...... H04L 5/0096
2019/0007248 A1* 1/2019 Takeda .................. H04W 28/06
2019/0246427 A1* 8/2019 Mukherjee ............. H04L 5/001

* cited by examiner

*Primary Examiner* — Joshua Kading
(74) *Attorney, Agent, or Firm* — Fish & Richardson P.C.

(57) ABSTRACT

Provided is a method for transmitting a sounding reference signal (SRS) in a wireless communication system. Specifically, a method performed by a user equipment includes: receiving from a base station resource configuration information for transmitting the SRS on a specific component carrier (CC); performing carrier switching from a first component carrier to a second component carrier; and transmitting the SRS to the base station on the switched component carrier based on the received resource configuration information.

20 Claims, 14 Drawing Sheets

FIG. 7
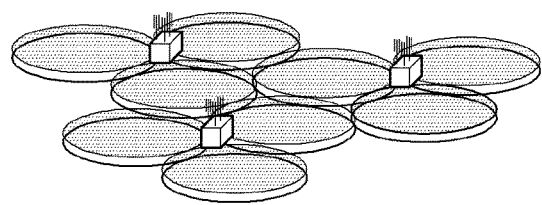
(a)
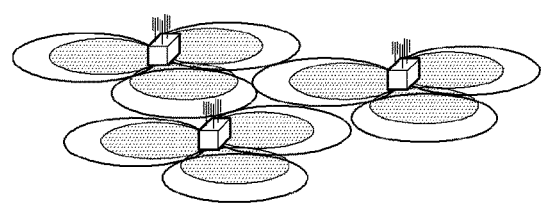
(b)
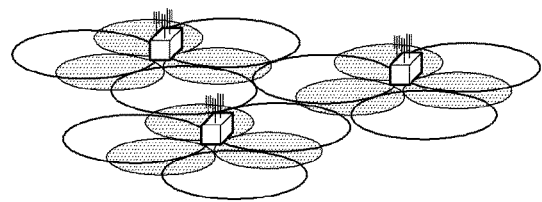
(c)
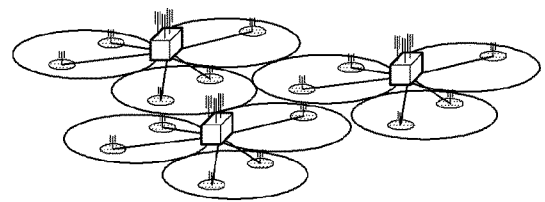
(d)
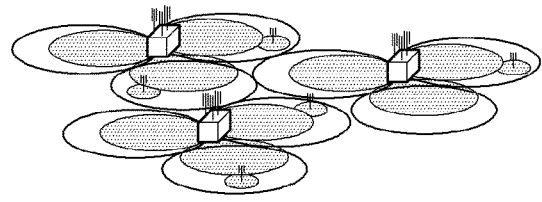
(e)

METHOD FOR TRANSMITTING SRS IN A WIRELESS COMMUNICATION SYSTEM AND APPARATUS THEREFOR

CROSS-REFERENCE TO RELATED APPLICATIONS

This application claims the benefit of U.S. provisional application No. 62/544,246 filed on Aug. 11, 2017. The contents of this application are hereby incorporated by reference in its entirety.

BACKGROUND OF THE INVENTION

Field of the Invention

The present invention relates to a wireless communication system, and more particularly, to a method for transmitting a sounding reference signal (SRS) and an apparatus for supporting the same.

Related Art

A mobile communication system has been developed to provide a voice service while ensuring an activity of a user. However, in the mobile communication system, not only a voice but also a data service is extended. At present, due to an explosive increase in traffic, there is a shortage of resources and users demand a higher speed service, and as a result, a more developed mobile communication system is required.

Requirements of a next-generation mobile communication system should be able to support acceptance of explosive data traffic, a dramatic increase in per-user data rate, acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

SUMMARY OF THE INVENTION

The present invention provides a method for performing an SRS carrier switching operation for transmitting an SRS on a specific component carrier (CC) in a wireless communication system supporting carrier aggregation (CA).

The present invention also provides a collision handling method between DMRS and SRS transmissions.

The technical objects of the present invention are not limited to the aforementioned technical objects, and other technical objects, which are not mentioned above, will be apparently appreciated by a person having ordinary skill in the art from the following description.

In an aspect, provided is a method for transmitting a sounding reference signal (SRS) in a wireless communication system. More specifically, the method performed by a user equipment includes: receiving from a base station resource configuration information for transmitting the SRS on a specific component carrier (CC); performing carrier switching from a first component carrier to a second component carrier; and transmitting the SRS to the base station on the switched component carrier based on the received resource configuration information.

Further, the first component carrier and the second component carrier may be carriers having a time division duplexing (TDD) frame structure.

In addition, a resource for transmitting the SRS may be allocated to a specific time resource region of the first component carrier, and one or more mini-slots may be configured in at least one of a front portion or a rear portion of the specific time resource region.

Further, the resource configuration information may further include information indicating a time resource position of a mini-slot configured in the first component carrier.

In addition, when a physical uplink shared channel (PUSCH) demodulation reference signal (DMRS) symbol and the specific time resource region overlap with each other on the first component carrier, the transmission of the SRS may be dropped on the second component carrier.

Further, the PUSCH DMRS symbol may include an additional DMRS symbol.

In addition, the first component carrier and the second component carrier may be configured at the same subcarrier spacing.

Further, when the first component carrier and the second component carrier are configured at different subcarrier spacings, a carrier switching start position in the first component carrier may be determined by considering a start position and a carrier switching time of a transmission symbol interval of the SRS.

In addition, a carrier switching end position in the first component carrier may be determined by considering an end position and the carrier switching time of the transmission symbol interval of the SRS.

In another aspect, provided is a user equipment for transmitting a sounding reference signal (SRS) in a wireless communication system and the user equipment includes: a radio frequency (RF) module for transmitting and receiving a radio signal; and a processor functionally connected with the RF module, in which the processor is configured to receive from a base station resource configuration information for transmitting the SRS on a specific component carrier (CC), perform carrier switching from a first component carrier to a second component carrier, and transmit the SRS to the base station on the switched component carrier based on the received resource configuration information.

The present invention has an advantage in that an SRS can be transmitted in a wireless communication system supporting carrier aggregation (CA) through an SRS carrier switching operation.

Further, the present invention has an advantage in that performance of a system can be enhanced by providing a collision handling method so as to prevent a collision between DMRS and SRS transmissions.

Advantages which can be obtained in the present invention are not limited to the aforementioned effects and other unmentioned advantages will be clearly understood by those skilled in the art from the following description.

BRIEF DESCRIPTION OF THE DRAWINGS

In order to help understanding of the present invention, the accompanying drawings which are included as a part of the Detailed Description provide embodiments of the present invention and describe the technical features of the present invention together with the Detailed Description.

FIG. 7 illustrates examples of deployment scenarios considering the carrier aggregation in an NR system.

DESCRIPTION OF EXEMPLARY EMBODIMENTS

Figure 1:
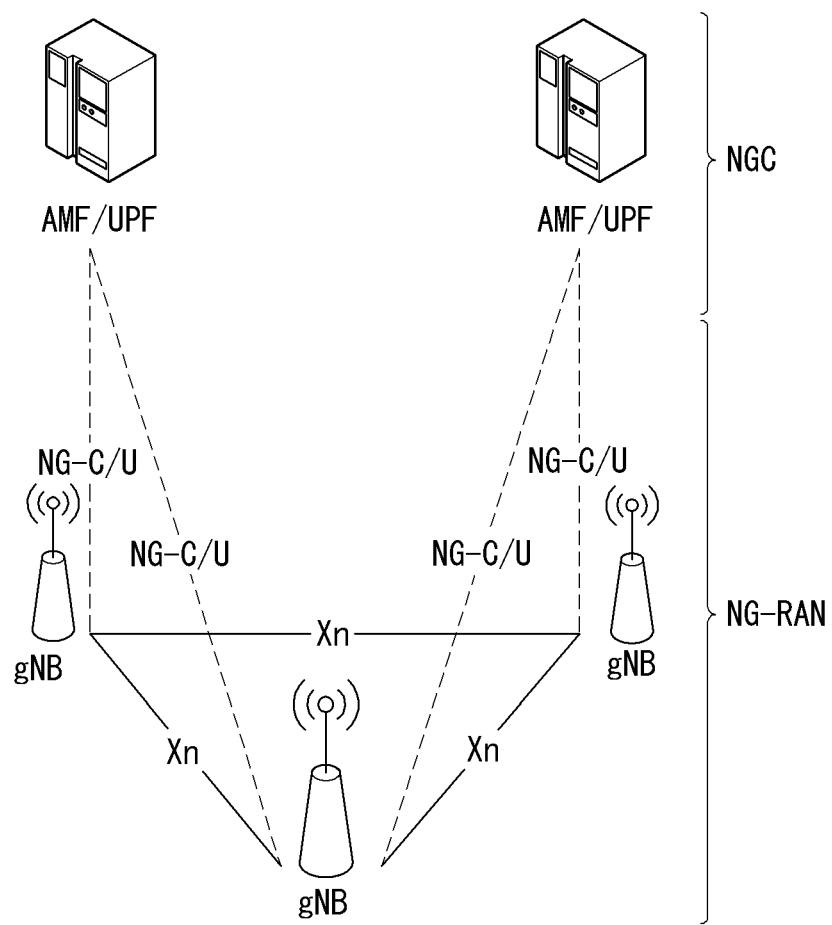
FIG. 1 is a diagram illustrating an example of an overall system structure of NR to which a method proposed in this specification may be applied.

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (Wi-MAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

In addition, 5G NR (new radio) defines enhanced mobile broadband (eMBB), massive machine type communications (mMTC), ultra-reliable low latency communications (URLLC), and vehicle-to-everything.

The 5G NR standard distinguishes between standalone (SA) and non-standalone (NSA) depending on the co-existence between the NR system and the LTE system.

The 5G NR supports various subcarrier spacing, CP-OFDM in the downlink, CP-OFDM in the uplink, and DFT-s-OFDM (SC-OFDM).

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or µ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| µ | $\Delta f = 2^\mu \cdot 15$ [kHz] | Cyclic prefix (CP) |
|---|---|---|
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, a size of various fields in the time domain is expressed as a multiple of a time unit of $T_s = 1/(\Delta f_{max} \cdot N_f)$. In this case, $\Delta f_{max} = 480 \cdot 10^3$, and $N_f = 4096$. DL and UL transmission is configured as a radio frame having a section of $T_f = (\Delta f_{max} N_f/100) \cdot T_s = 10$ ms. The radio frame is composed of ten subframes each having a section of $T_{sf} = (\Delta f_{max} N_f/1000) \cdot T_s = 1$ ms. In this case, there may be a set of UL frames and a set of DL frames.

Figure 2:
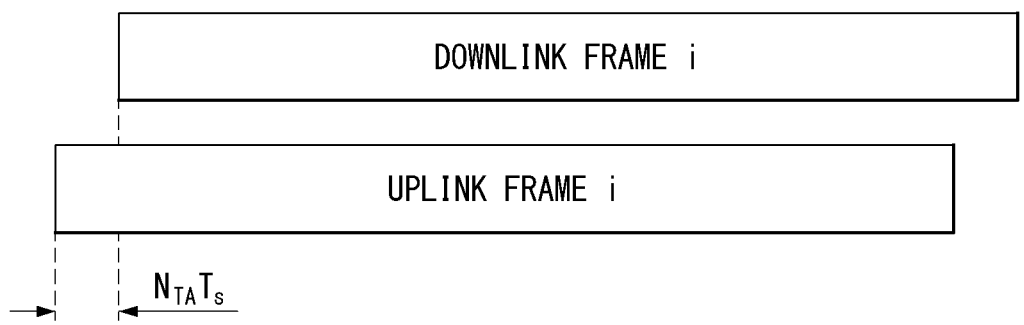
FIG. 2 illustrates a relationship between an uplink frame and a downlink frame in a wireless communication system to which the method proposed in this specification may be applied.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA} = N_{TA} T_s$ before the start of a corresponding DL frame in the UE.

Regarding the numerology µ, slots are numbered in ascending order of $n_s^\mu \in \{0, \ldots, N_{subframe}^{slots,\mu}-1\}$ in a subframe, and in ascending order of $n_{s,f}^\mu \varepsilon \{0, \ldots, N_{frame}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology µ, and Table 3 shows the number of OFDM symbols per slot for an extended CP in the numerology µ.

TABLE 2

| | | | Slot configuration | | | |
|---|---|---|---|---|---|---|
| | | 0 | | | 1 | |
| µ | $N_{symb}^\mu$ | $N_{frame}^{slot,\mu}$ | $N_{subframe}^{slot,\mu}$ | $N_{symb}^\mu$ | $N_{frame}^{slot,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | | | Slot configuration | | | |
|---|---|---|---|---|---|---|
| | | 0 | | | 1 | |
| µ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |

TABLE 3-continued

Slot configuration

| | | 0 | | | 1 | |
|---|---|---|---|---|---|---|
| μ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 3:
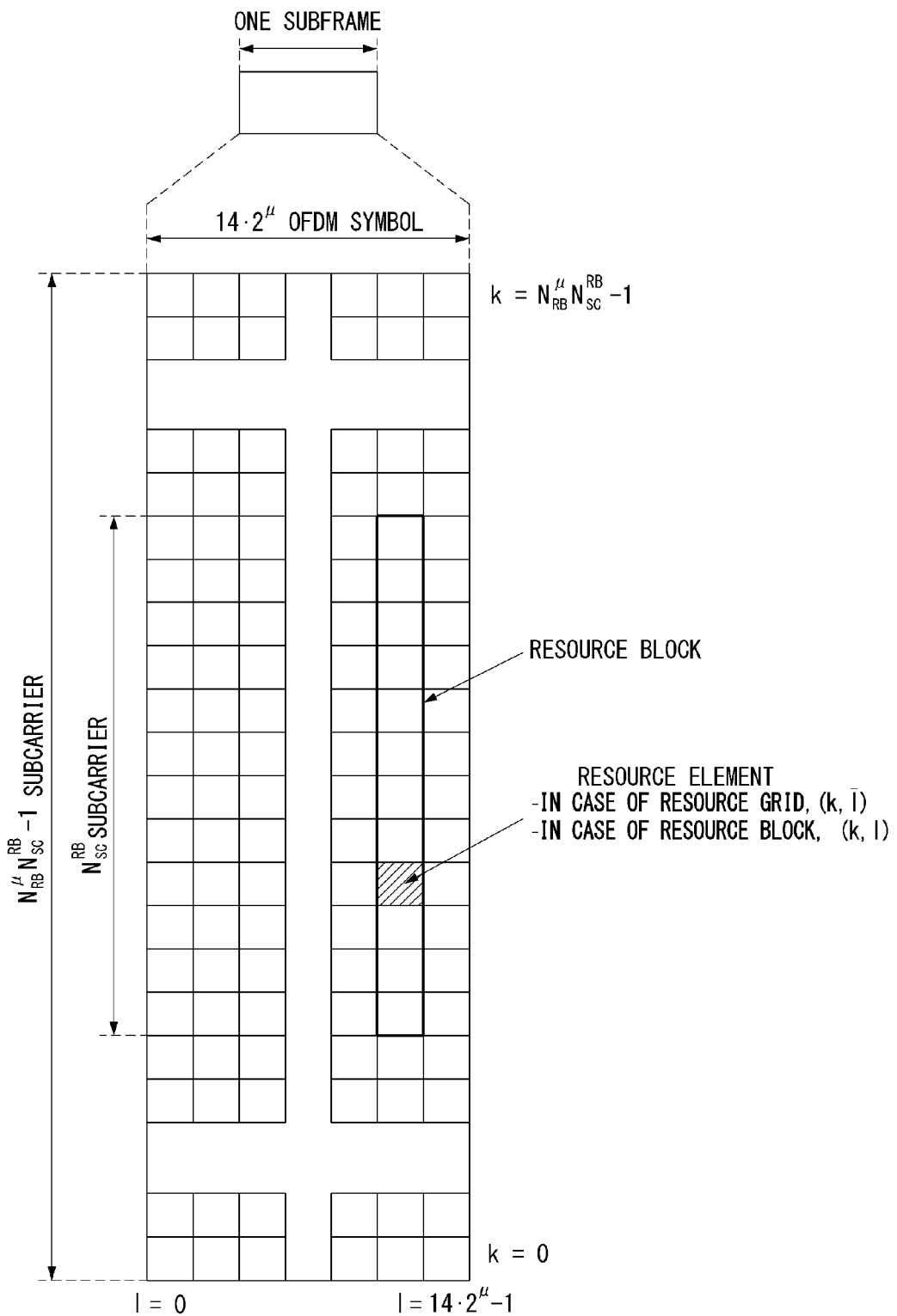
FIG. 3 illustrates an example of a resource grid supported in the wireless communication system to which the method proposed in this specification may be applied.

FIG. 3 illustrates an example of a resource grid supported in a wireless communication system to which a method proposed by the present disclosure may be implemented.

Referring to FIG. 3, a resource grid is composed of $N_{RB}^{\mu}N_{sc}^{RB}$ subcarriers in a frequency domain, each subframe composed of 14·2μ OFDM symbols, but the present disclosure is not limited thereto.

In the NR system, a transmitted signal is described by one or more resource grids, composed of $N_{RB}^{\mu}N_{sc}^{RB}$ subcarriers, and $2^{\mu}N_{symb}^{(\mu)}$ OFDM symbols Herein, $N_{RB}^{\mu} \leq N_{RB}^{max,\mu}$. The above $N_{RB}^{max,\mu}$ indicates the maximum transmission bandwidth, and it may change not just between numerologies, but between UL and DL.

Figure 4:
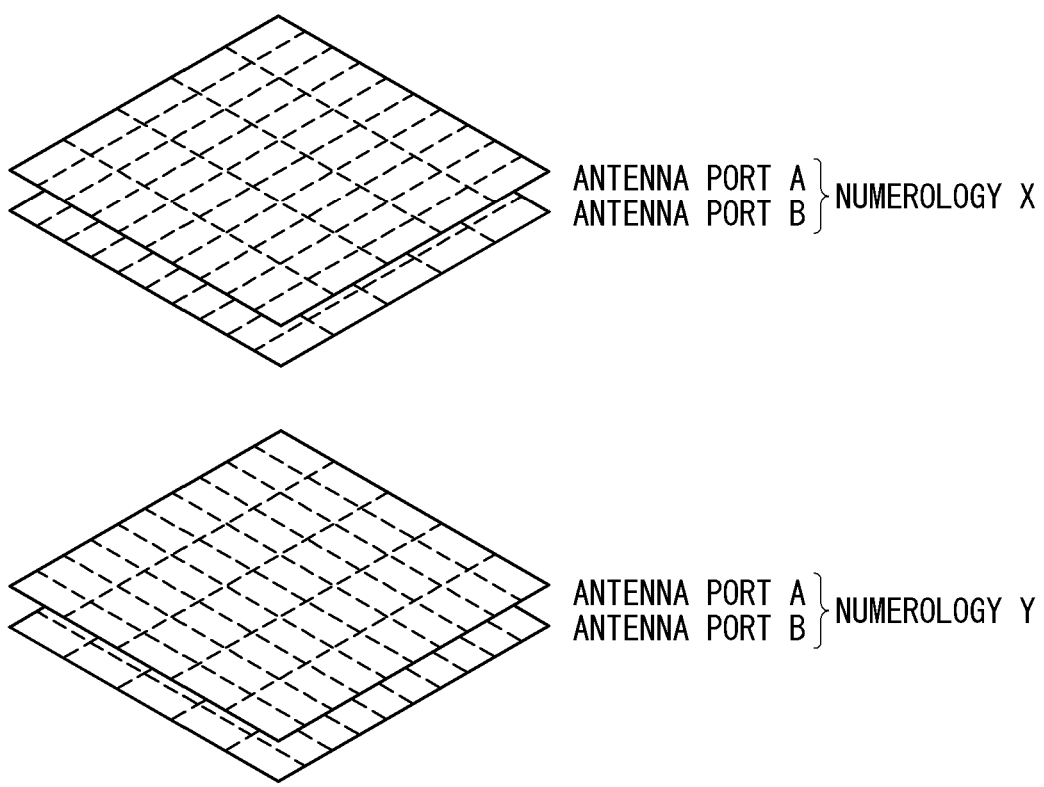
FIG. 4 illustrates examples of a resource grid for each antenna port and numerology to which the method proposed in this specification may be applied.

In this case, as illustrated in FIG. 4, one resource grid may be configured for the numerology μ and an antenna port p.

FIG. 4 shows examples of antenna ports and ringer-specific resource grids to which the method proposed herein can be applied.

Each element of the resource grid for the numerology μ and the antenna port p is indicated as a resource element, and may be uniquely identified by an index pair (k,l̄). Herein, k=0, . . . , $N_{RB}^{\mu}N_{sc}^{RB}-1$ is an index in the frequency domain, and l̄=0, . . . , $2^{\mu}N_{symb}^{(\mu)}-1$ indicates a location of a symbol in a subframe. To indicate a resource element in a slot, the index pair (k,l̄) is used. Herein, l=0, . . . , $N_{symb}^{\mu}-1$.

The resource element (k,l̄) for the numerology μ and the antenna port p corresponds to a complex value $a_{k,l̄}^{(p,\mu)}$. When there is no risk of confusion or when a specific antenna port or numerology is specified, the indexes p and μ may be dropped and thereby the complex value may become $a_{k,l̄}^{(p)}$ or $a_{k,l̄}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Self-Contained Subframe Structure

A time division duplexing (TDD) structure taken into consideration in the NR system is a structure in which both uplink (UL) and downlink (DL) are processed in a single subframe. This is for minimizing latency of data transmission in the TDD system, and such a structure is called a self-contained subframe structure.

Figure 5:
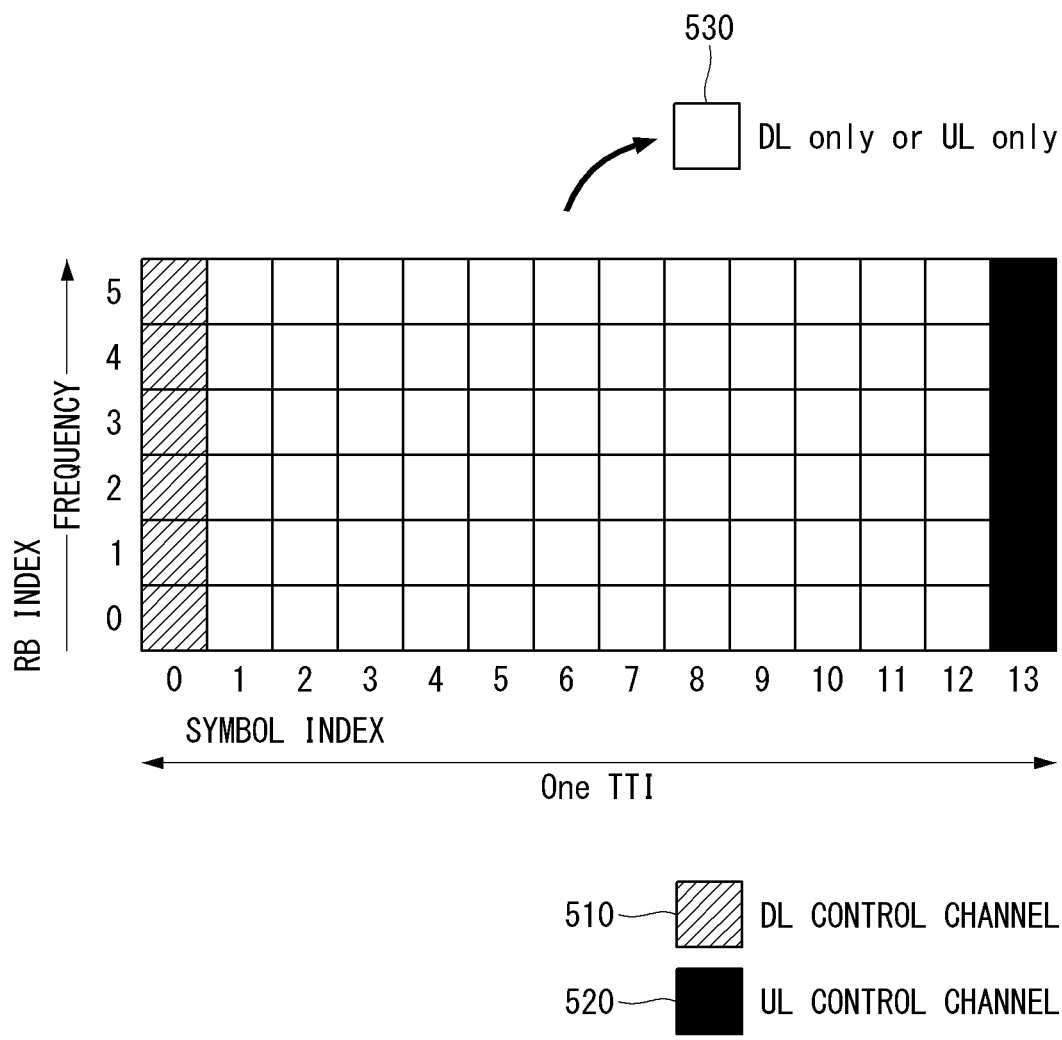
FIG. 5 is a diagram illustrating one example of a self-contained slot structure to which the method proposed in this specification may be applied.

FIG. 5 shows an example of a self-contained subframe structure to which a method proposed in this specification may be applied. FIG. 5 is only for convenience of description, and does not limit the scope of the present invention.

Referring to FIG. 5, in the case of legacy LTE, a case where one subframe includes 14 orthogonal frequency division multiplexing (OFDM) symbols is assumed.

In FIG. 5, a region 510 means a downlink control region, and a region 520 means an uplink control region. Furthermore, a region (i.e., a region not having a separate indication, 530) may be used for the transmission of downlink data or the transmission of uplink data.

If the structure is used, downlink transmission and uplink transmission are sequentially performed in one self-contained subframe. The transmission of downlink data and the reception of uplink ACK/NACK may be performed.

Such a slot can be defined as a 'self-contained slot'.

As a result, when an error of data transmission occurs, the time taken up to the retransmission of data may be reduced. Accordingly, latency related to data delivery can be minimized.

In such a self-contained slot structure, the base station and the terminal need a time gap for switching from the transmission mode to the reception mode or switching from the reception mode to the transmission mode.

To this end, in the slot structure, some OFDM symbols at the time of switching from DL to UL are set as a guard period (GP).

Carrier Aggregation

A communication environment considered in embodiments of the present invention includes all multi-carrier support environments. That is, a multi-carrier system or carrier aggregation (CA) system used in the present invention is a system in which, when a target wide band is configured, one or more component carriers (CCs) having a bandwidth smaller than a target bandwidth are aggregated and used in order to support a wide band.

In the present invention, multi-carriers refer to aggregation (or carrier aggregation) of carriers and in this case, the aggregation of the carriers refers to both aggregation of contiguous carriers and aggregation of non-contiguous carriers. Further, the number of components carriers aggregated between the downlink and the uplink may be set differently. A case where the number of downlink component carriers (hereinafter, referred to as 'DL CC') is equal to the number of uplink component carriers (hereinafter, referred to as 'UL CC') is referred to as symmetric aggregation and a case where the number of downlink CCs is different from the number of uplink CCs is referred to as asymmetric aggregation. Such carrier aggregation may be used interchangeably with terms such as carrier aggregation, bandwidth aggregation, spectrum aggregation, and the like.

Carrier aggregation configured by combining two or more component carriers aims at supporting up to 100 MHz bandwidth in the LTE-A system. When one or more carriers having a bandwidth smaller than the target bandwidth are combined, the bandwidth of the combined carriers may be limited to the bandwidth used in the existing system in order to maintain backward compatibility with the existing IMT system. For example, in the existing 3GPP LTE system, {1.4, 3, 5, 10, 15, 20} MHz bandwidth is supported and in 3GPP LTE-advanced system (that is, LTE-A), a bandwidth larger than 20 MHz may be supported by using only the bandwidths for compatibility with the existing system. Further, the carrier aggregation system used in the present invention may support the carrier aggregation by defining a new bandwidth regardless of the bandwidth used in the existing system.

The LTE-A system uses a concept of a cell to manage radio resources.

The aforementioned carrier aggregation environment may be referred to as a multiple-cell environment. The cell is defined as a combination of a pair of a downlink resource (DL CC) and an uplink resource (UL CC), but the uplink resource is not required. Accordingly, the cell may be constituted by the downlink resource along or by the downlink resource and the uplink resource. When a specific user equipment has only one configured serving cell, the specific user equipment may have one DL CC and one UL CC, but when the specific user equipment has two or more configured serving cells, the specific user equipment may have DL CCs as many as the cells and the number of UL CCs may be equal to or smaller therethan.

Alternatively, on the contrary, the DL CC and the UL CC may be configured. That is, when the specific user equipment has multiple configured serving cells, a carrier aggregation environment in which the number of UL CCs is larger than the number of DL CCs may also be supported. That is, the carrier aggregation may be appreciated as aggregation of two or more different cells having carrier frequencies (center frequency of the cell), respectively. Here, the term 'cell' needs to be distinguished from a 'cell' as an area covered by the base station which is generally used.

The cell used in the LTE-A system includes a primary cell (PCell) and a secondary cell (SCell). The P cell and the S cell may be used as the serving cell. In the case of a user equipment which is in an RRC_CONNECTED state, but does not configure the carrier aggregation or does not support the carrier aggregation, only one serving cell configured only by the P cell exists. On the contrary, in the case of a user equipment which is in the RRC_CONNECTED state and configures the carrier aggregation, one or more serving cells may exist and the entire serving cell includes the P cell and one or more S cells.

The serving cell (P cell and S cell) may be configured through an RRC parameter. PhysCellId has integer values of 0 to 503 as a physical layer identifier of the cell. SCellIndex has integer values of 1 to 7 as a short identifier used for identifying the S cell. ServCellIndex has integer values of 0 to 7 as a short identifier used for identifying the serving cell (P cell or S cell). The 0 value is applied to the P cell and SCellIndex is previously granted to be applied to the S cell. That is, a cell having the smallest cell ID (or cell index) in ServCellIndex becomes the P cell.

The P cell refers to a cell operating on a primary frequency (or primary CC). The user equipment may be used to perform an initial connection establishment process or a connection re-establishment process and may refer to a cell indicated during a handover process. Further, the P cell refers to a cell which becomes a center of control related communication among the serving cells configured in the carrier aggregation environment. That is, the user equipment may be allocated the PUCCH only in the P cell thereof and may transmit the allocated PUCCH and may use only the P cell for acquiring system information or changing a monitoring procedure. Evolved Universal Terrestrial Radio Access (E-UTRAN) may change only the P cell for the handover procedure by using an RRC connection reconfiguration message of a higher layer, which includes mobility control information to the user equipment that supports the carrier aggregation environment.

The S cell refers to a cell operating on a second frequency (or secondary CC). Only one P cell may be allocated to the specific user equipment and one or more S cells may be allocated to the specific user equipment. The S cell may be configured after the RRC connection is configured and may be used to provide an additional radio resource. The PUCCH does not exist in remaining cells other than the P cell among the serving cells configured in the carrier aggregation environment, that is, the S cell. When the E-UTRAN adds the S cell to the user equipment supporting the carrier aggregation environment, the E-UTRAN may provide all the system information related to the operation of a related cell which is in the RRC_CONNECTED state through a dedicated signal. The change of the system information may be controlled by releasing and adding the related S cell and the RR connection reconfiguration message of the higher layer may be used at this time. The E-UTRAN may perform dedicated signaling with different parameters for each user equipment rather than broadcasting within the related S cell.

After an initial security activation process starts, the E-UTRAN may configure a network including one or more S cells in addition to the P cell initially configured in the connection establishment process. In the carrier aggregation environment, the P cell and the S cell may operate as respective component carriers. In the following embodiments, the primary component carrier (PCC) may be used in the same meaning as the P cell and the secondary component carrier (SCC) may be used in the same meaning as the S cell.

Figure 6:
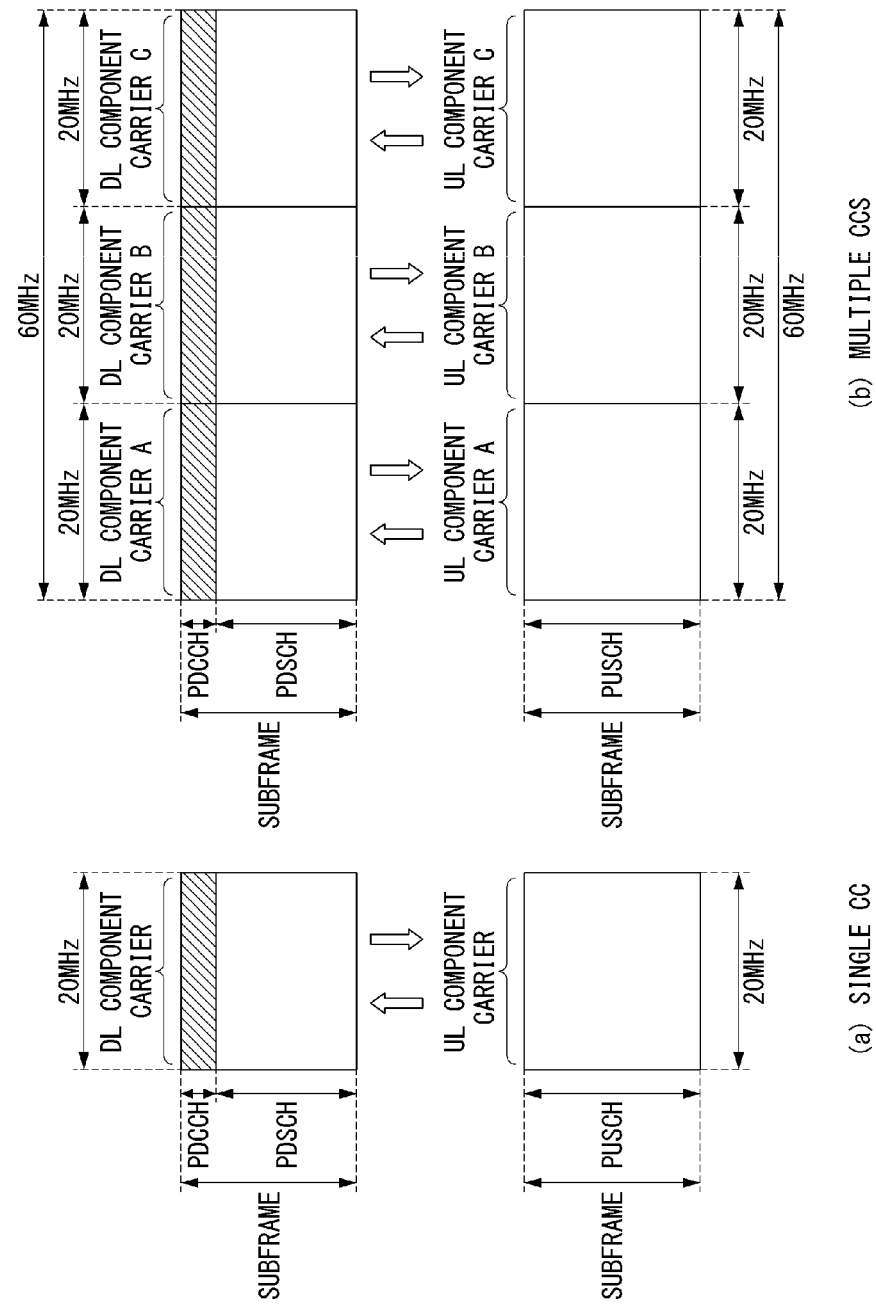
FIG. 6 illustrates examples of a component carrier and carrier aggregation in a wireless communication system to which the present invention may be applied.

FIG. 6 illustrates examples of a component carrier and carrier aggregation in a wireless communication system to which the present invention may be applied.

FIG. 6A illustrates a single carrier structure used in the LTE system. The component carrier includes the DL CC and the UL CC. One component carrier may have a frequency range of 20 MHz.

FIG. 6B illustrates a carrier aggregation structure used in the LTE-A system. FIG. 6B illustrates a case where three component carriers having a frequency magnitude of 20 MHz are combined. There are three DL CCs and three UL CCs, but the number of DL CCs and UL CCs are not limited. In the case of the carrier aggregation, the user equipment may simultaneously monitor three CCs, and receive a downlink signal/data and transmit an uplink signal/data.

When N DL CCs are managed in a specific cell, the network may allocate M (M≤N) DL CCs to the user equipment. In this case, the UE may monitor only M limited DL CCs and receive the DL signal. Further, the network may allocate a primary DL CC to the user equipment by assigning priorities to L (L≤M≤N) DL CCs and in this case, the UE needs to particularly monitor L DL CCs. Such a scheme may be similarly applied even to uplink transmission.

A linkage between the carrier frequency (or DL CC) of the downlink resource and the carrier frequency (or UL CC) of the uplink resource may be indicated by a higher layer message such as an RRC message or system information. For example, a combination of the DL resource and the UL resource may be configured by a linkage defined by System Information Block Type2 (SIB2). Specifically, the linkage may refer to a mapping relationship between a DL CC in which a PDCCH carrying a UL grant is transmitted and a UL CC that uses the UL grant or may refer to a mapping relationship between a DL CC (or UL CC) in which data for HARQ is transmitted and a UL CC (or DL CC) in which an HARQ ACK/NACK signal is transmitted.

When one or more S cells are configured in the user equipment, the network may activate or deactivate the configured S cell(s). The P cell is continuously activated. The network activates or deactivates the S cell(s) by transmitting an activation/deactivation MAC control element.

The activation/deactivation MAC control element has a fixed size and is configured by a single octet including seven C fields and one R field. The C field is configured for each S cell index and indicates an activation/deactivation state of the S cell. When a C field value is set to '1', the set '1' indicates that the S cell having a corresponding S cell index is activated and when the C field value is set to '0', the S cell having the corresponding S cell is deactivated.

Further, the user equipment maintains a timer (sCellDeactivationTimer) for each configured S cell and deactivates the related S cell when the timer expires. The same initial timer value is applied to each instance of the timer (sCellDeactivationTimer) and is configured by an RRC signaling. When the S cell(s) is added or after handover, initial S cell(s) is in a deactivated state.

The user equipment performs the following operation with respect to respective configured S cell(s) in each TTI.
  When the user equipment receives the activation/deactivation MAC control element that deactivates the S cell in a specific TTI (subframe n), the user equipment activates the S cell at a corresponding TTI (subframe n+8 or thereafter) and (re)starts the timer related with the corresponding S cell. A fact that the user equipment activates the S cell refers to applying a general S cell operation such as sounding reference signal (SRS) transmission on the S cell, channel quality indicator (CQI)/precoding matrix indicator (PMI)/rank indication (RI)/precoding type indicator (PTI) reporting for the S cell, PDCCH monitoring on the S cell, and PDCCH monitoring for the S cell.
  When the user equipment receives the activation/deactivation MAC control element that deactivates the S cell in the specific TTI (subframe n) or the timer related with the activated S cell in the specific TTI (subframe n) expires, the user equipment deactivates the S cell in the TTI (subframe n+8 or thereafter) corresponding to the predetermined timing, stops the timer of the corresponding S cell, and flushes all HARQ buffers related with the corresponding S cell.
  When the PDCCH on the activated S cell indicates the uplink grant or downlink grant or the PDCCH on the serving cell that schedules the activated S cell indicates the uplink grant or downlink grant for the activated S cell, the user equipment restarts the timer related with the corresponding S cell.
  When the S cell is deactivated, the user equipment does not transmit the SRS on the S cell, does not report a CQI/PMI/RI/PTI for the S cell, does not transmit the UL-SCH on the S cell, and does not monitor the PDCH on the S cell.

Contents regarding the carrier aggregation are described based on the LTE-LTE-A system, but this is merely for convenience of description and may be extensively applied even to a 5G NR system in the same manner or similarly. In particular, carrier aggregation deployment scenarios which may be considered in the 5G NR system may be illustrated in FIG. 7.

FIG. 7 illustrates examples of deployment scenarios considering the carrier aggregation in an NR system.

Referring to FIG. 7, F1 and F2 may refer to a cell configured at a first frequency (or a first frequency band, first carrier frequency, and a first center frequency) and a cell configured at a second frequency (or a second frequency band, a second carrier frequency, and a second center frequency), respectively.

FIG. 7A illustrates a first CA deployment scenario. As illustrated in FIG. 7A, the F1 cell and the F2 cell may be co-located or overlaid at the same position. In this case, both two layers may provide sufficient coverage and mobility may be supported in two layers. The corresponding scenario may include a case where the F1 cell and the F2 cell exist in the same band. In the corresponding scenario, it may be expected that the F1 cell and the F2 cell which overlap with each other may be aggregated.

FIG. 7B illustrates a second CA deployment scenario. As illustrated in FIG. 7B, the F1 cell and the F2 cell may exist at the same position, but the F2 cell may support smaller coverage due to larger path loss. In this case, only the F1 cell may provide the sufficient coverage and the F2 cell may be used to improve a throughput. In this case, the mobility may be performed based on the coverage of the F1 cell. The corresponding scenario may include a case where the F1 cell and the F2 cell exist in different bands (e.g., 800 MHz or 2 GHz for the F1 cell and 3.5 GHz for the F2 cell). In the corresponding scenario, it may be expected that the F1 cell and the F2 cell which overlap with each other may be aggregated.

FIG. 7C illustrates a third CA deployment scenario. As illustrated in FIG. 7C, the F1 cell and the F2 cell exist at the same position, but an antenna of the F2 cell may be connected to a boundary of the F2 cell so as to increase the throughput of a cell boundary. In this case, the F1 cell may provide the sufficient coverage, but the F2 cell may have a hole due to potentially larger path loss or the like. In this case, the mobility may be performed based on the coverage of the F1 cell. The corresponding scenario may include a case where the F1 cell and the F2 cell exist in different bands (e.g., 800 MHz or 2 GHz for the F1 cell and 3.5 GHz for the F2 cell). In the corresponding scenario, it may be expected that the F1 cell and the F2 cell of the same base station (eNB) may be aggregated in a region where the coverage overlaps.

FIG. 7D illustrates a fourth CA deployment scenario. As illustrated in FIG. 7D, the F1 cell may provide macro coverage and F2 remote radio heads (RRHs) are used for improvement of the throughput at a hot spot. In this case, the mobility may be performed based on the coverage of the F1 cell. The corresponding scenario may include both a case where the F1 cell and the F2 cell correspond to DL non-contiguous carriers in the same band (e.g., 1.7 GHz etc.) and a case where the case where the F1 cell and the F2 cell exist in different bands (e.g., 800 MHz or 2 GHz for the F1 cell and 3.5 GHz for the F2 cell). In the corresponding scenario, it may be expected that the F2 cells (i.e., RRHs) may be aggregated with an underlying F1 cell (i.e., macrocell)(s) connected thereto.

FIG. 7E illustrates a fifth CA deployment scenario. The corresponding scenario is similar to the second CA deployment scenario described above, but frequency selective repeaters may be deployed such that the coverage for one of the carrier frequencies may be extended. In the corresponding scenario, it may be expected that the F1 cell and the F2 cell of the same base station may be aggregated in the region where the coverage overlaps.

Even by different serving cells, a reception timing difference (e.g., depending on the number of control symbols, propagation, and the deployment scenario) in a physical layer of UL grants and DL assignments for the same TTI may affect an MAC operation. The user equipment may need to process a relative propagation delay difference up to 30 us among CCs to be aggregated in both intra-band non-contiguous CA and an inter-band non-contiguous CS. This may mean that since a time alignment of the base station is specified at a maximum of 0.26 us, the user equipment needs to process a delay spread of up to 30.26 us among CCs monitored at the receiver. Further, this may mean that the user equipment needs to process a maximum uplink transmission timing difference among TAGs of 36.37 us with respect to inter-band CA having multiple TAGs.

When a CA is deployed, frame timing and system frame number (SFN) may be aligned across the aggregated cells.

Random Access Procedure

Hereinafter, a random access procedure provided by the LTE/LTE-A system will be described.

The random access procedure is used for the user equipment to obtain uplink synchronization with the base station or to be allocated uplink radio resources. After the user equipment is powered on, the user equipment acquires downlink synchronization with an initial cell and receives the system information. Information regarding a set of usable random access preambles and radio resources used for transmitting the random access preamble is obtained from the system information. The radio resource used for transmitting the random access preamble may be specified by a combination of at least one subframe index and an index on a frequency domain. The user equipment transmits the random access preamble randomly selected from the set of the random access preambles and the base station that receives the random access preamble sends a timing alignment value for the uplink synchronization to the user equipment through a random access response. As a result, the user equipment acquires the uplink synchronization.

The random access procedure is a common procedure in frequency division duplex (FDD) and time division duplex (TDD). The random access procedure is independent of a cell size and is also independent of the number of serving cells when carrier aggregation (CA) is configured.

First, a case where the user equipment performs the random access procedure is as follows.

Case where the user equipment does not have the RRC connection with the base station and performs an initial access in an RRC idle state Case where an RRC connection re-establishment procedure is performed Case where the user equipment initially accesses a target cell during the handover process Case where the random access procedure is requested by a command of the base station Case where data to be transmitted in the downlink is generated in a non-synchronized state in a situation in which uplink time alignment does not match during the RRC connection state Case where data to be transmitted in the uplink is generated in the non-synchronized state or in a situation in which a designated radio resource used for requesting the radio resource is not allocated during the RRC connection state Case of performing positioning the user equipment in a situation in which a timing advance is required during the RRC connection state Case of performing a recovery procedure when a radio link failure or a handover failure occurs In 3GPP Rel-10, it is considered that a timing advance (TA) value applicable to one specific cell (for example, P cell) is commonly applied to a plurality of cells in a wireless access system supporting the carrier aggregation. However, the user equipment may aggregate a plurality of cells belonging to different frequency bands (i.e., largely spaced in frequency) or a plurality of cells having different propagation characteristics. Further, in a situation in which a small cell such as a remote radio header (RRH) (i.e., a repeater), a femto cell, or a pico cell, or a secondary base station is deployed in the cell, when the user equipment communicates with a base station (i.e., a macro eNB) through one cell and communicates with the secondary base station through another cell, the plurality of cells may have different propagation delay characteristics. In this case, when performing uplink transmission using a scheme that commonly applies the TA value to the plurality of cells, the uplink transmission may seriously affect the synchronization of the uplink signals transmitted on the plurality of cells. Accordingly, in a CA situation in which the plurality of cells is aggregated, it may be desirable that a plurality of TAs is provided and in 3GPP Rel-11, it is considered that the TA is independently allocated in units of a specific cell group in order to support multiple TAs. This is referred to as a TA group (TAG) and the TAG may include one or more cells and the same TA may be commonly applied to one or more cells included in the TAG. In order to support the multiple TAs, an MAC TA common control element is constituted by a 2-bit TAG ID and a 6-bit TA command field.

When the user equipment in which the carrier aggregation is configured performs the random access procedure in association with the P cell, the user equipment performs the random access procedure. In the case of a TAG (i.e., primary TAG (pTAG) to which the P cell belongs, TA may be applied to all cell(s) in the pTAG, which is determined based on the P cell similarly as in the related art or adjusted through the random access procedure accompanied in the P cell. On the contrary, in the case of a TAG (i.e., secondary TAG (sTAG)) constituted only by the S cell, TA determined based on a specific S cell in the sTAG may be applied to all cell(s) in the corresponding sTAG and in this case, the TA may be acquired by the random access procedure initiated by the base station. Specifically, in the sTAG, the S cell is configured with a random access channel (RACH) resource and the base station requests an RACH access in the S cell in order to determine the TA. That is, the base station initiates RACH transmission on the S cells by a PUCCH order transmitted in the P cell. A response message to an S cell preamble is transmitted through the P cell by using the RA-RNTI. The user equipment may apply TA determined based on an S cell that successfully completes the random access to all cell(s) in the corresponding sTAG. As such, the random access procedure may be performed even in the S cell in order to acquire the timing alignment of the sTAG to which the corresponding S cell belongs even in the S cell.

In the LTE/LTE-A system, both a contention based random access procedure in which the user equipment randomly selects and uses one preamble in a specific set and a non-contention based random access procedure in which the base station uses the random access preamble allocated only to a specific user equipment, in a process of selecting a random access preamble (RACH preamble) are provided. However, when the non-contention based random access procedure is requested by the command of the base station during the handover, the non-contention based random access procedure may be used only in user equipment positioning and/or timing advance alignment for the sTAG. After the random access procedure is completed, general uplink/downlink transmission occurs.

Meanwhile, a relay node (RN) also supports both the contention-based random access procedure and the non-contention-based random access procedure. When the relay node performs the random access procedure, an RN subframe configuration is suspended at that time. That is, this means that the RN subframe configuration is temporarily discarded. Thereafter, the RN subframe configuration is resumed at the time when the random access procedure is successfully completed.

Figure 8:
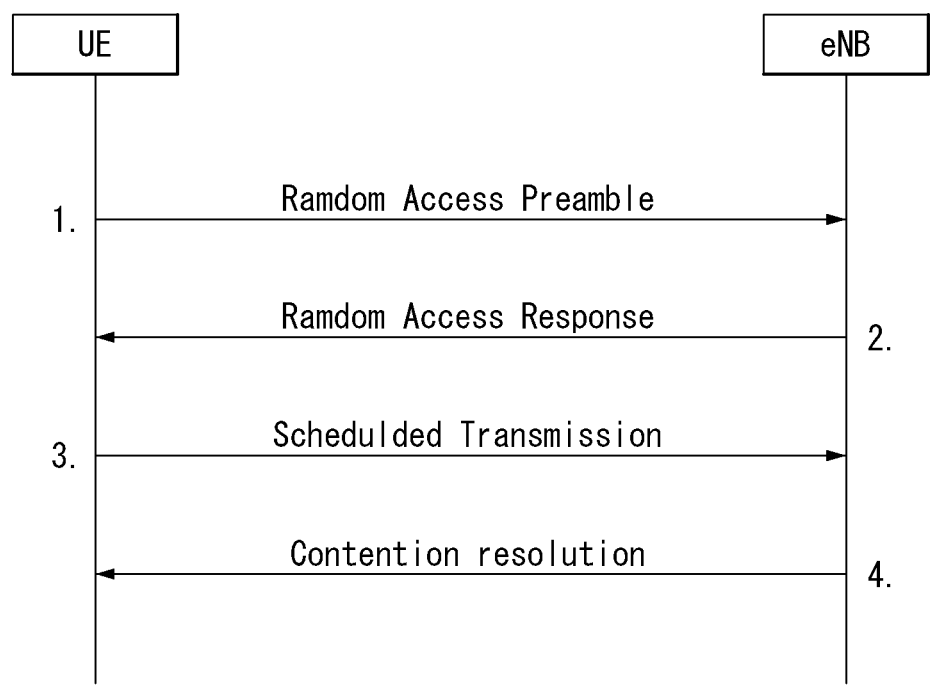
FIG. 8 is a diagram for describing a contention based random access procedure in the wireless communication system to which the present invention may be applied.

FIG. 8 is a diagram for describing a contention based random access procedure in the wireless communication system to which the present invention may be applied.

(1) First Message (Msg 1, Message 1)

First, the user equipment randomly selects one random access preamble (RACH preamble) at the set of the random access preambles indicated through the system information or a handover command and selects and transmits a physical RACH (PRACH) resource capable of transmitting the random access preamble.

The random access preamble is transmitted in 6 bits in an RACH transmission channel and 6 bits are constituted by a random identity of 5 bits for identifying a user equipment for transmitting the RACH and a size of 1 bit (e.g., a third message (Msg 3)) for representing additional information.

The base station that receives the random access preamble from the user equipment decodes the preamble and acquires the RA-RNTI. The RA-RNTI related with the PRACH in which the random access preamble is transmitted is determined according to a time-frequency resource of the random access preamble transmitted by the corresponding user equipment.

(2) Second Message (Msg 2, Message 2)

The base station transmits to the user equipment a random access response addressed by the RA-RNTI acquired through the preamble on the first message. The random access response may include a random access (RA) preamble index/identifier, an UL grant indicating the uplink radio resource, a temporary C-RNTI (TC-RNTI), and time alignment commands (TACs). The TAC is information indicating a time alignment value which the base station sends to the UE to maintain uplink time alignment. The user equipment updates uplink transmission timing by using the time alignment value. When the user equipment updates time alignment, a timer alignment timer is initiated or restarted. The UL grant includes uplink resource allocation and a transmit power command (TPC) used for transmitting a scheduling message (third message) to be described below. The TPC is used for determining transmit power for a scheduled PUSCH.

The user equipment transmits the random access preamble and thereafter, the base station attempts to receive the random access response thereof within a random access response window indicated through the system information or the handover command, detects a PDCCH masked with the RA-RNTI corresponding to the PRACH, and receives a PDSCH indicated by the detected PDCCH. Random access response information may be transmitted in a format of an MAC packet data unit (PDU) and the MAC PDU may be delivered through the PDSCH. The PDCCH preferably includes information on a user equipment which needs to receive the PDSCH, frequency and time information of the radio resource of the PDSCH, and a transmission format of the PDSCH. As described above, once the user equipment successfully detects the PDCCH transmitted thereto, the user equipment may properly receive the random access response transmitted on the PDSCH according to the information of the PDCCH.

The random access response window means a maximum time interval in which the user equipment transmitting the preamble waits to receive the random access response message. The random access response window has a length of "ra-ResponseWindowSize' starting from a subframe after three subframes in a last subframe in which the preamble is transmitted. That is, the user equipment waits to receive the random access response during the random access window secured from a subframe after three subframes in transmission of the preamble is terminated. The user equipment may acquire a random access window size ('ra-ResponseWindowsize') parameter value through the system information and a random access window size may be determined as values of 2 to 10.

When the user equipment successfully receives the random access response having the same random access preamble index/identifier as the random access preamble transmitted to the base station, monitoring the random access response is suspended. On the contrary, when the random access response message is not received until the random access response window is terminated or a valid random access response having the same random access preamble index as the random access preamble transmitted to the base station is not received, it is regarded that the random access response is unsuccessfully received and thereafter, the user equipment may perform preamble retransmission.

As described above, the reason why the random access preamble index is required in the random access response is that since the random access response for one or more user equipments may be included in one random access response, notifying for which user equipment the UL grant, TC-RNTI, and the TAC are valid is required.

(3) Third Message (Msg 3, Message 3)

When the user equipment receives the valid random access response thereto, the user equipment processes each of the information included in the random access response. That is, the user equipment applies the TAC and stores the TC-RNTI. Further, by using the UL grant data stored in a buffer of the user equipment or newly generated data is transmitted to the base station. In the case of the initial access of the user equipment, an RRC connection request generated in the RRC layer and delivered through CCCH may be included in the third message and transmitted and in the case of the RRC connection re-establishment procedure, an RRC connection re-establishment request generated in the RRC layer and delivered through the CCCH may be included in the third message and transmitted. Further, an NAS access request message may be included.

The third message needs to include the identifier of the user equipment. In the contention based random access procedure, the base station may not determine which user equipment performs the random access procedure and the reason is that the user equipment needs to be identified in order to resolve the collision later.

There are two methods of encapsulating the identifier of the user equipment. In a first method, when the user equipment has a valid cell identifier (C-RNTI) already allocated in the cell before the random access procedure, the user equipment transmits the cell identifier thereof through an uplink transmission signal corresponding to the UL grant. On the contrary, when the valid cell identifier may not be allocated before the random access procedure, the user equipment encapsulates and transmits a unique identifier (e.g., S-TMSI or a random number) thereof. In general, the unique identifier is longer than the C-RNTI. In transmission on the UL-SCH, user equipment specific scrambling is used. However, when the user equipment is not yet allocated the C-RNTI, the scrambling may not be based on the C-RNTI, but instead, the TC-RNTI received in the random access response is used. When the user transmits data corresponding to the UL grant, the user equipment initiates a contention resolution timer for resolving the collision.

(4) Fourth Message (Msg 4, Message 4)

When the base station receives the C-RNTI of the corresponding user equipment through the third message, the base station transmits the fourth message to the user equipment by using the received C-RNTI. On the contrary, when the base station receives the unique identifier (i.e., S-TMSI or random number) from the user equipment through the third message, the base station transmits the fourth message to the user equipment by using the TC-RNTI allocated to the corresponding user equipment. Here, the fourth message may correspond to an RRC connection setup message including the C-RNTI.

After the user equipment transmits the data including the identifier thereof through the UL grant included in the random access response, the user equipment waits for an instruction of the base station to resolve the collision. That is, the user equipment attempts to receive the PDCCH in order to receive a dedicated message. There are also two methods for receiving the PDCCH. As mentioned above, when the identifier of the third message transmitted to correspond to the UL grant is the C-RNTI, the user equipment attempts to receive the PDCCH by using the C-RNTI thereof and when the identifier is the unique identifier (i.e., S-TMSI or random number), the user equipment attempts to receive the PDCCH by using the TC-RNTI included in the random access response. Thereafter, in the former case, when the user equipment receives the PDCCH through the C-RNTI thereof before the contention resolution timer expires, the user equipment determines that the random access procedure is normally performed and terminates the random access procedure. In the latter case, when the user equipment receives the PDCCH through the TC-RNTI before the contention resolution timer expires, the user equipment verifies data delivered by the PDSCH indicated by the PDCCH. When the contents of the data include the unique identifier of the user equipment, the user equipment determines that the random access procedure is normally performed and terminates the random access procedure. The user equipment acquires the C-RNTI through the fourth message and thereafter, the user equipment and the network transmit and receive a user equipment dedicated message by using the C-RNTI.

Next, a method for resolving the collision in the random access will be described.

The reason for the collision in performing the random access is basically because the number of random access preambles is finite. That is, since the base station may not grant the random access preambles unique to the user equipment to all user equipments, the user equipment randomly selects one of common random access preambles and transmits the selected random access preamble. Accordingly, although a case where two or more user equipments select and transmit the same random access preamble through the same radio resource (PRACH resource) occurs, the base station determines the selected random access preamble as one random access preamble transmitted in one user equipment. As a result, it is predicted that the base station transmits the random access response to the user equipment and one user equipment receives the random access response. However, since the collision may occur as described above, two or more user equipments receive one random access response, and as a result, each user equipment performs an operation depending on reception of the random access response. That is, there is a problem in that two or more user equipments transmit different data to the same radio resource by using one UL grant included in the random access response. As a result, all transmission of the data may be unsuccessful and the base station may receive only data of a specific user equipment according to positions or transmission powers of the user equipments. In the latter case, since all of two or more user equipments assume that data transmissions of the user equipments are successful, the base station needs to notify to user equipments which fail in the contention information on the failure. That is, notifying the information on the failure or success in the contention is referred to as contention resolution.

There are two contention resolution methods. One method is a method using the contention resolution timer and the other method is a method for transmitting the identifier of the user equipment which succeeds in transmission to the user equipments. The former case is used in a case where the user equipment already has the unique C-RNTI before the random access procedure. That is, the user equipment already having the C-RNTI transmits data including the C-RNTI thereof to the base station according to the random access response and operates the contention resolution timer. When the PDCCH information indicated by the C-RNTI of the user equipment is received before the contention resolution timer expires, the UE determines that the user equipment succeeds in the contention and ends the random access normally. On the contrary, when the user equipment may not receive the PDCCH indicated by the C-RNTI thereof before the contention resolution timer expires, the user equipment may determine that the user equipment fails in the contention and perform the random access procedure again or notify the failure to the higher layer. Among the contention resolution methods, in the latter case, that is, the method for transmitting the identifier of the user equipment which succeeds in transmission is used in a case where the user equipment has no unique cell identifier before the random access procedure. That is, when the user equipment has no cell identifier thereof, data including a higher identifier (S-TMSI or random number) than the cell identifier is transmitted according to UL grant information included in the random access response and the user equipment operates the contention resolution timer. When the data including the higher identifier thereof is transmitted through the DL-SCH before the contention resolution timer expires, the user equipment determines that the random access procedure is successful. On the contrary, when the user equipment may not receive the data including the higher identifier thereof through the DL-SCH before the contention resolution timer expires, the user equipment determines that the random access procedure is unsuccessful.

Meanwhile, in the case of an operation in a non-contention random access procedure, the random access procedure ends only by first message transmission and second message transmission unlike the contention based random access procedure illustrated in FIG. 8. However, the user equipment is allocated the random access preamble from the base station before transmitting the random access preamble to the base station as the first message, transmits the allocated random access preamble to the base station as the first message, and receives the random access response from the base station, and as a result, the random access procedure ends.

In general, an uplink component carrier (UL CC) support capability of a communication terminal is lower than a downlink component carrier (DL CC) support capability.

Here, the carrier means a modulated waveform carrying E-UTRA, UTRA or GSM/EDGE physical channels and the carrier frequency means the center frequency of the cell.

Here, the cell means a radio network object which may be uniquely identified by the UE from (cell) identification broadcasted on a geographical area from one UTRAN access point and the cell is in an FDD or TDD mode.

In such a situation, since the SRS is periodically transmitted to the TDD carrier that is used in the downlink only, overall downlink transmission efficiency using channel reciprocity may be enhanced.

Such an operation will be referred to as 'SRS carrier switching'.

Figure 9:
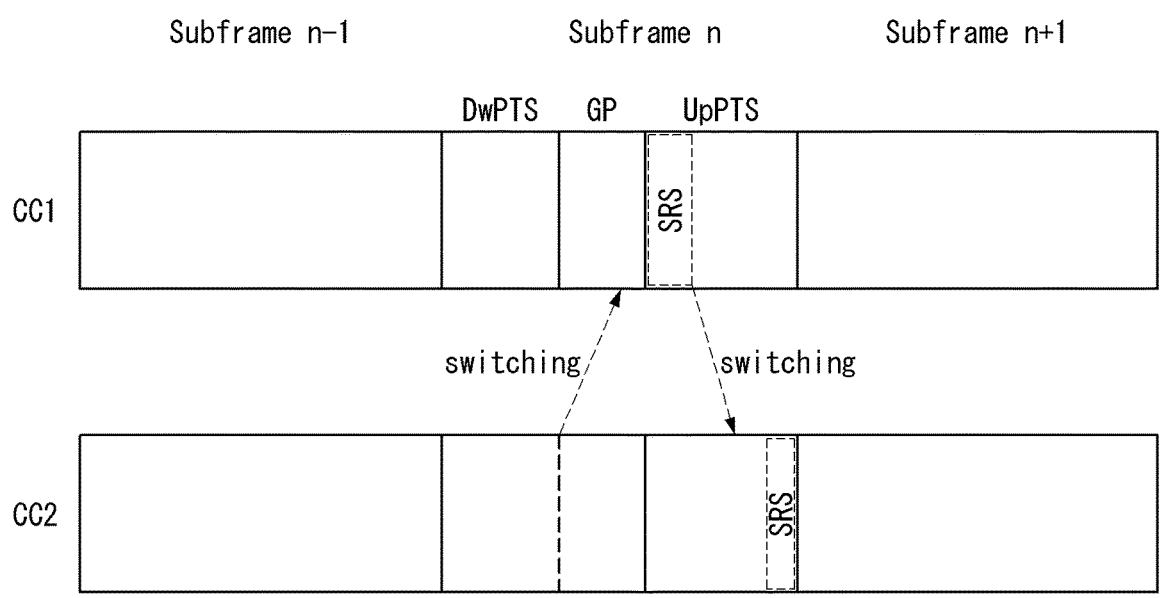
FIG. 9 is a diagram illustrating an example of SRS carrier based switching.

FIG. 9 is a diagram illustrating an example of SRS carrier based switching.

In FIG. 9, CC1 and CC2 may be TDD carriers and it can be seen that the SRS is transmitted while switching between carriers.

That is, in the SRS carrier switching operation, CC2 is a CC which is a starting point and an ending point of the SRS carrier switching operation and CC1 may mean a CC which is subjected to carrier switching.

Hereinafter, methods for supporting SRS carrier switching in the NR system proposed in this specification will be described in detail.

For easy description, it is assumed that a component carrier, which is a starting point in the SRS carrier switching operation, is 'CC1', and a component carrier which becomes a destination point and actually transmits the SRS is 'CC2'.

That is, the SRS carrier switching operation is made in an order in which the operation starts at CC1, the SRS is transmitted at CC2, and the operation returns to CC1 again.

When the SRS is transmitted with respect to multiple component carriers, the SRS transmission may be indicated in the order of CC2, CC3, etc. according to a carrier switching order.

That is, the SRS transmission may be performed while carrier switching in the order of CC1→CC2→CC3→ . . . →CC1.

Hereinafter, switched carriers, that is, CC2, CC3, etc. will be indicated as CCn (n>1).

In the carrier switching operation, there is a time additionally required before transmitting the SRS due to RF tuning, power transient, etc. and this will be referred to as 'switching time'.

The switching time may be different for each UE.

Accordingly the switching time may be configured to be reported by a UE capability.

Alternatively, a value of the switching time is set in the form of a minimum requirement and the user equipment may be configured to comply with the switching time value.

A case of carrier switching from CC1 to CC2 will be described as an example.

Uplink transmission of CC1 may be interrupted by a round-trip switching time and a time required for transmission of the SRS in CC2.

Here, a time when the uplink transmission of CC1 is interrupted will be referred to as an 'interruption time'.

When the SRS carrier switching operation is performed with respect to multiple CCs, the interruption time may be defined as a sum of the switching time and a sum of the SRS transmission time in each step.

The methods proposed in this specification are not limited between the CCs (or within the CC) and may be extensively applied between different frequency bands (or subbands) in one CC or to different bandwidth parts (BWPs) in one CC.

First, a method for configuring a resource (transmission resource) for SRS transmission in CC2 will be described.

That is, a method for configuring an SRS transmission resource in the switched carrier will be described.

The SRS transmission resource in CC2 may be configured by the following methods based on a dynamic time division duplexing (TDD) type frame structure (e.g., frame structure type 2) of the NR system.

The following methods are not limited to CC2 and when the SRS carrier switching is performed with respect to multiple CCs, the following methods may be extensively applied to CCn (n>1).

Here, CCn represents the switched carrier.

(1) In a dynamic TDD operation, the SRS transmission resource may be configured in a slot (e.g., PRACH reserved slot, etc.) or a symbol designated as static UL with respect to CC2.

(2) In the dynamic TDD operation, the SRS transmission resource may be configured based on a subframe which is commonly UL in a DL/UL configuration of CC1 and CCn (n>1).

(3) The SRS transmission resource may be configured at an uplink portion of a self-contained slot (or subframe) of CC2.

When the uplink portion in the self-contained slot (or subframe) is positioned behind the slot (or subframe), a location of the SRS transmission resource may be set by considering the corresponding location.

Herein, the self-contained slot/subframe represents a slot/subframe type constituted by a downlink portion, a gap, and an uplink portion and detailed contents related with the self-contained slot/subframe will be described with reference to FIG. 5.

(4) The location of the SRS transmission resource may be differently set according to an NR slot/subframe format of CC1 and/or CC2.

The expression of CA and/or B' disclosed in this specification may be construed as the same meaning as 'including at least one of A and B'.

(5) The location of the SRS transmission resource of CC2 may be set by the switching time from the end of the corresponding subframe in order to limit the interruption time in CC1 to one subframe.

In this case, since the switching time may be a UE capability, the switching time may be specifically set with reference to UE capability information or the location of the SRS transmission resource may be set based on a maximum switching time.

(6) The transmission resource of SRS is fixed at a specific location in the slot/subframe of CC1 and a mini-slot may be configured for the remaining portion.

The mini-slot may be constituted by 2, 4 or 7 OFDM symbols.

The mini-slot may be positioned such that the interruption time due to the SRS carrier switching in the slot/subframe of the CC1 is avoided.

For example, when the SRS transmission resource is positioned at the end of the slot/subframe of the CC1, a preceding part of the slot/subframe of the CC1 is configured by one or multiple mini-slots to perform multiplexing in the slot/subframe of the CC1.

Alternatively, when the SRS transmission resource is positioned in the middle of the slot/subframe of the CC1, one or multiple mini-slots may be deployed before and/or after the interruption time.

Figure 10:
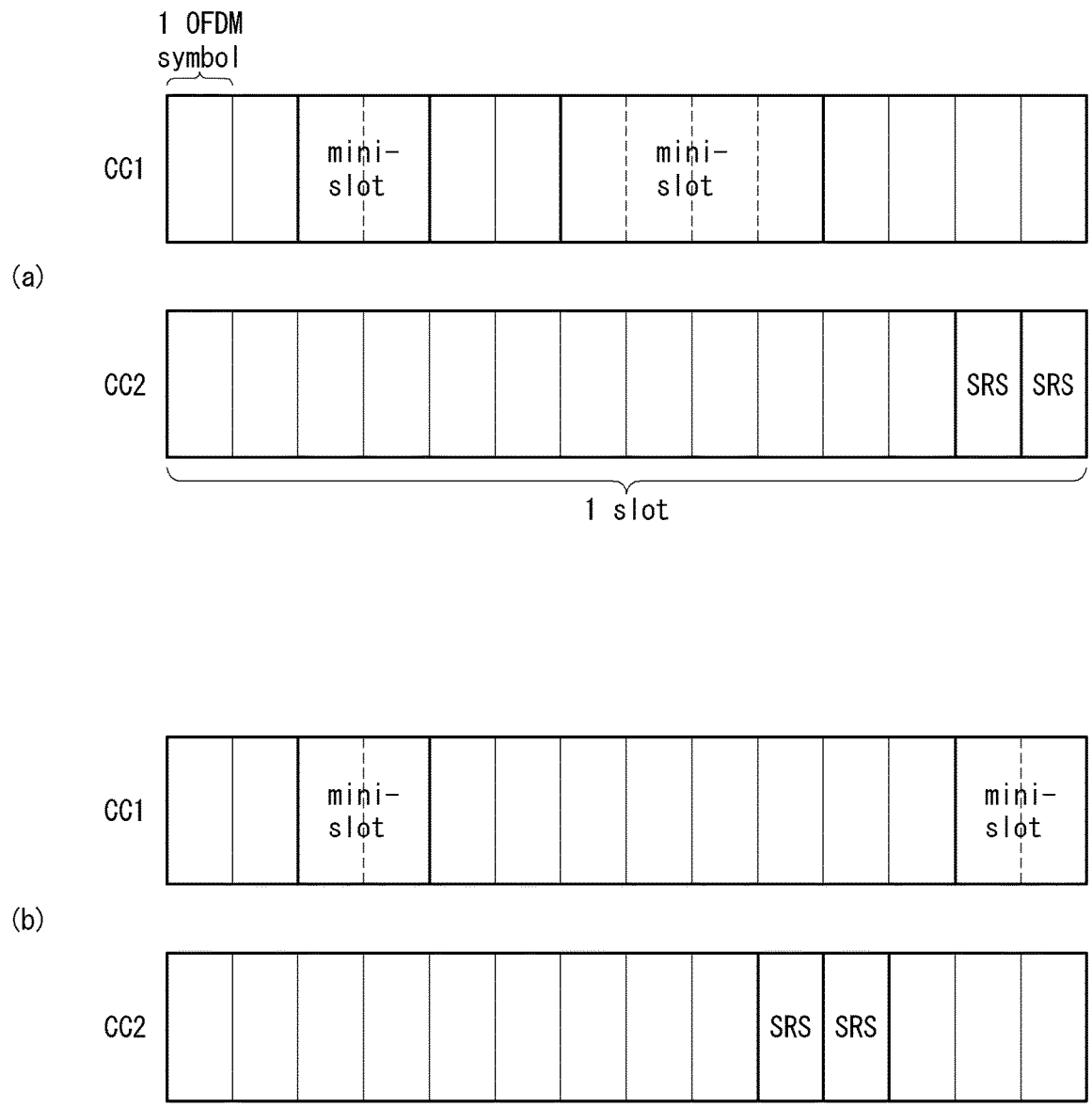
FIG. 10 is a diagram illustrating one example of a SRS transmission resource configuration proposed by this specification.

FIG. 10 is a diagram illustrating one example of a SRS transmission resource configuration proposed by this specification.

That is, FIG. 10A illustrates an example in which when the SRS transmission resource is positioned at the end of the slot, the mini-slots are configured and FIG. 10B illustrates an example in which when the SRS transmission resource is positioned at a middle portion of the slot, the mini-slots are configured.

In the NR, the SRS may be transmitted in 1, 2, or 4 contiguous symbols for each SRS resource after the PUSCH and the SRS may be allocated to 6 last symbols in one slot.

In addition, the SRS may be subjected to time division multiplexing (TDM) with short PUCCH (sPUCCH) at a symbol level.

(7) In addition, the base station may explicitly notify that the corresponding region (the interruption time of the CC1) may not be used to the UE by using a method which is the same as an invalid interval configuration and indication method of the mini-slot.

Next, when the SRS carrier switching operation is performed, a collision handling method will be described.

When the SRS carrier switching operation is performed, since the uplink transmission is impossible for the interruption time of the CC1, a part or the entirety of the slot/subframe of the CC1 may not be used.

In this case, the following methods may be considered.

(1) In the NR, a case where a physical uplink shared channel (PUSCH) demodulation reference signal (DMRS) symbol location is variable is considered.

In this case, when the PUSCH DMRS symbol of the CC1 overlaps with the interruption time, SRS transmission in the CC2 is dropped.

When the PUSCH DMRS symbol of the CC1 does not overlap with the interruption time, both the SRS and the (rate-matched or punctured) PUSCH may be transmitted.

(2) In the NR, an additional DMRS in the CC1 may be selected or dropped by considering the interruption time.

For example, when the additional DMRS may be (additionally and optionally) configured in addition to a basic PUSCH DMRS, in the case where the additional DMRS in the CC1 overlaps with the interruption time (additional DRMS collision), the additional DMRS may be configured to be dropped.

Alternatively, in an additional DMRS collision situation in the CC1, the SRS transmission may be configured to be dropped.

(3) When the PUSCH including UCI information in the CC1 collides with the interruption time, the SRS transmission in the CC2 may be dropped.

Alternatively, when the additional DRMS in the CC1 is dropped and the collision with the interruption time is avoided, the additional DMRS is dropped.

In this case, both the SRS in the CC2 and the PUSCH in the CC1 may be transmitted.

(4) Alternatively, the PUSCH containing the UCI information in the CC1 may be configured so that the SRS transmission in the CC2 is dropped at the collision with the PUSCH data, regardless of the (additional) DMRS collision of the CC1.

(5) The PUSCH not containing the UCI information in the CC1 may be configured so that the PUSCH data in the CC1 and the SRS transmission in the CC2 are dropped when the (additional) collision in the CC1 does not occur.

(6) The PUSCH not containing the UCI information in the CC1 may be configured so that the SRS transmission in the CC2 is dropped when the (additional) collision in the CC1 occurs.

(7) Alternatively, the PUSCH not containing the UCI information in the CC1 may be configured so that the PUSCH not containing the UCI information is dropped when the (additional) collision in the CC1 occurs.

(8) An NR PUCCH format of the CC1 may be configured differently according to the interruption time.

For example, a shorter NR PUCCH format among the NR PUCCH formats in the CC1 may be selected as the interruption time is longer.

(9) An NR slot/frame format of the CC1 may be configured differently according to the interruption time.

For example, when the interruption time collides with the preceding part of the slot/subframe (slot/subframe n+1) of the next CC1, considering the influence on the preceding part of slot/subframe n+1 of the CC1, main information such as downlink control or the DMRS of the CC1 may be delayed or a slot/subframe type of slot/subframe n+1 of the CC1 may be changed.

(10) Considering the interruption time, the mini-slot may be used in the CC1 or the number of OFDM symbols constituting the mini-slot may be adjusted.

Next, methods for defining a restriction or reducing the switching time or interruption time in order to prevent the interruption time from being generated in the CC1 will be described.

(1) The SRS carrier switching is supported only between CCs of the same numerology.

(2) The SRS carrier switching is supported only when subcarrier spacing of CCn (n>1) is larger than the CC1.

The resulting effect is that the interruption time for the CC1 may be minimized.

(3) Even when the subcarrier spacing of CCn (n>1) is larger than the CC1, the SRS carrier switching is permitted and in this case, the subcarrier spacing of an SRS carrier transmission symbol of CCn (n>1) is configured to be equal to the CC1 or at least smaller than the subcarrier spacing of CCn (n>1).

(4) Only when the interruption time is smaller than one slot/subframe, the SRS carrier switching is permitted.

In this case, the subcarrier spacing for the SRS transmission symbol of CCn (n>1) may be determined or limited so that SRS transmission is possible during the remaining interval other than the round-trip switching time in the interruption time.

(5) When a multi-beam operation is performed, a beam sweeping/refinement operation (e.g., beam sweeping/refinement resolution) in the CC2 or CCn (n>1), etc. may be limited so that the SRS carrier switching is completed within the limited interruption time (e.g., 1 slot/subframe).

(6) When a multi-antenna operation is performed, an SRS antenna switching operation in the CC2 or CCn (n>1) or an operation within one period may be limited so that the SRS carrier switching is completed within the limited interruption time (e.g., 1 slot/subframe).

Next, the SRS carrier switching when numerologies of the CCs are different from each other will be described.

When the subcarrier spacings of the CC1 and the CC2 are different from each other in the NR, the following method may be considered.

The method to be described later may be applied even to multiple CCs (i.e., CC1, CC2, CC3, . . . ).

First, a case where the subcarrier spacing of the CC1 is larger than the subcarrier spacing of the CC2 will be described.

Since a symbol period of the CC2 is an integer multiple of the CC1, a switching start point s1 of the CC1 may be determined considering the starting point of an SRS transmission symbol interval in the CC2 and the switching time from the CC1 to the CC2.

In addition, a switching end point s2 of the CC1 is determined by considering the end of the SRS transmission symbol interval of the CC2 and the switching time from the CC2 to the CC1.

The interruption time of the CC1 may include s1 and s2 intervals and may be a symbol interval including an interval acquired by adding an additional margin a.

Here, a>=0 is satisfied.

In this case, in order to reduce the interruption time, the subcarrier spacing of the SRS transmission symbol in the CC2 may be set to be equal to that in the CC1.

In this case, SRS transmission symbols may be continuously configured as a ratio of the CC1 and the CC2.

Next, a case where the subcarrier spacing of the CC1 is smaller than the subcarrier spacing of the CC2 will be described.

Since the symbol period of the CC1 is an integer multiple of the symbol period of the CC2, the switching start point s1 of the CC1 may be determined considering the starting point of the SRS transmission symbol interval in the CC2 and the switching time from the CC1 to the CC2.

In addition, the switching end point s2 of the CC1 is determined by considering the end of the SRS transmission symbol interval of the CC2 and the switching time from the CC2 to the CC1.

Here, the interruption time of the CC1 may include the s1 and s2 intervals and may be the symbol interval including the interval acquired by adding the additional margin a.

Here, a>=0 is satisfied.

Next, the switching/interruption time will be described in more detail.

Since multiple numerology sets of the NR may be optionally supported, the following methods may be considered so that the switching time may be reported for each UE.

(1) A report in units of symbol (or slot or subframe) is defined so that the switching time is reported for each UE.

Here, in respect to the unit, an actual length of the symbol (or slot or subframe) may be calculated in units of reference numerology of a corresponding frequency band.

(2) The switching time may be reported in units of an absolute time (e.g., us) so that the switching time is reported for each UE.

(3) In addition, the base station may set any one of methods (1) and (2) above and thereafter, broadcast the set method to the UE through a system information block (SIB), etc.

Figure 11:
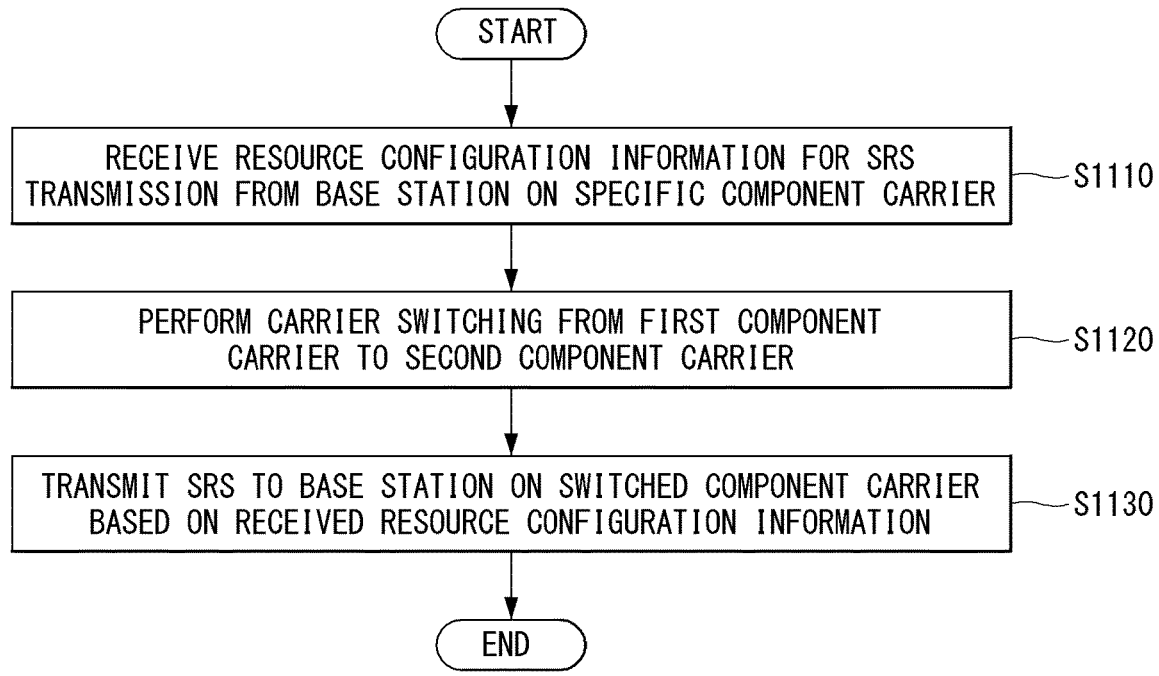
FIG. 11 is a diagram illustrating one example of an operating method of a user equipment for transmitting an SRS proposed in this specification.

FIG. 11 is a diagram illustrating one example of an operating method of a user equipment for transmitting an SRS proposed by this specification.

First, the user equipment receives from the base station resource configuration information for transmitting the SRS on a specific component carrier (CC) (S110).

The resource configuration information may further include information indicating a time resource position of a mini-slot configured in the first component carrier.

In addition, the user equipment performs carrier switching from a first component carrier to a second component carrier (S1120).

The first component carrier and the second component carrier may be carriers having a time division duplexing frame structure.

In addition, the user equipment transmits the SRS to the base station on the switched component carrier based on the received resource configuration information (S1130).

In addition, a specific time resource region of the first component carrier may be allocated a resource for transmission of the SRS and one or more mini-slots may be configured in at least one of a front portion and a rear portion of the specific time resource region. A detailed description thereof is described with reference to FIG. 10 described above.

Further, the resource for transmitting the SRS allocated to the specific time resource region of the first component carrier may be fixed.

In addition, when a physical uplink shared channel (PUSCH) demodulation reference signal (DMRS) symbol and the specific time resource region overlap with each other on the first component carrier, the transmission of the SRS may be dropped on the second component carrier.

The PUSCH DMRS symbol may include an additional DMRS symbol and the additional DMRS symbol may be one or two symbols.

In addition, the first component carrier and the second component carrier may be configured at the same subcarrier spacing.

Alternatively, when the first component carrier and the second component carrier are configured at different subcarrier spacings, a carrier switching start position in the first component carrier may be determined by considering a start position and a carrier switching time of a transmission symbol interval of the SRS.

In addition, a carrier switching end position in the first component carrier is determined by considering an end position and the carrier switching time of the transmission symbol interval of the SRS.

Overview of Devices to which Present Invention is Applicable

Figure 12:
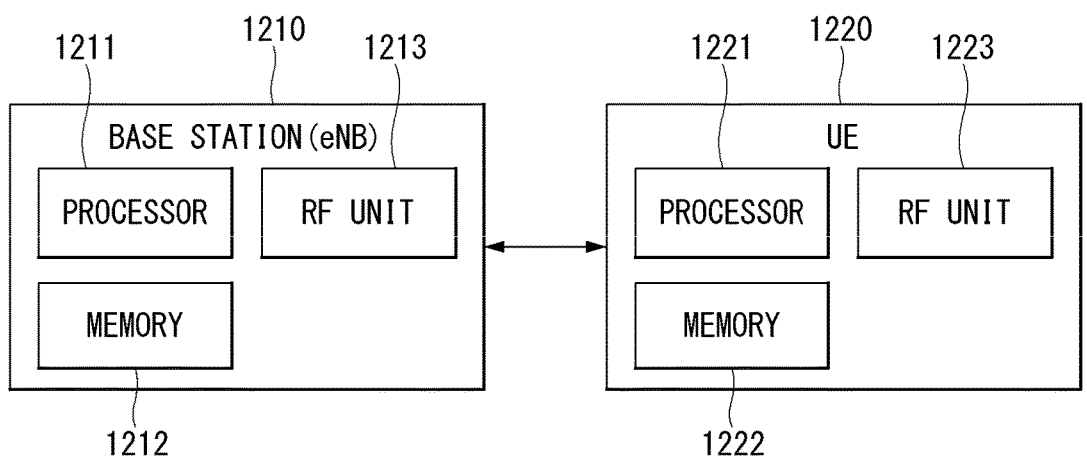
FIG. 12 illustrates a block diagram of a wireless communication device to which methods proposed in this specification may be applied.

FIG. 12 illustrates a block diagram of a wireless communication device to which methods proposed in this specification may be applied.

Referring to FIG. 12, a wireless communication system includes a base station 1210 and multiple user equipments 1210 positioned within an area of the base station.

Each of the BS and the UE may be expressed as a wireless device.

The BS 1210 includes a processor 1211, a memory 1212, and a radio frequency (RF) module 1213. The processor 1211 implements a function, a process, and/or a method which are proposed in FIGS. 1 to 11 above. Layers of a radio interface protocol may be implemented by the processor. The memory is connected with the processor to store various information for driving the processor. The RF module is connected with the processor to transmit and/or receive a radio signal.

The UE includes a processor 1221, a memory 1222, and an RF module 1223.

The processor implements a function, a process, and/or a method which are proposed in FIGS. 1 to 11 above. Layers of a radio interface protocol may be implemented by the processor. The memory is connected with the processor to store various information for driving the processor. The RF module 1223 is connected with the processor to transmit and/or receive a radio signal.

The memories 1212 and 1222 may be positioned inside or outside the processors 1211 and 1221 and connected with the processor by various well-known means.

Further, the base station and/or the UE may have a single antenna or multiple antennas.

Figure 13:
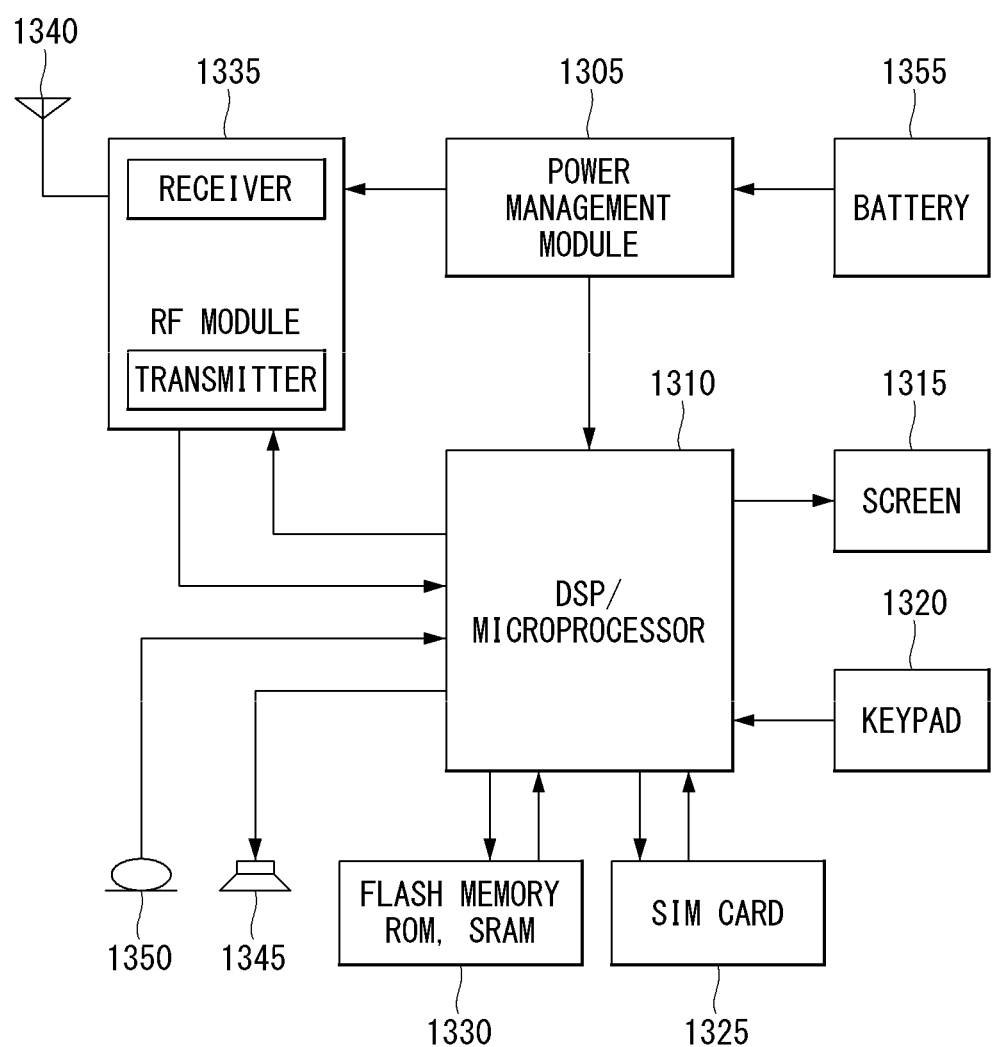
FIG. 13 illustrates a block diagram of a communication device according to an embodiment of the present invention.

FIG. 13 illustrates a block diagram of a communication device according to an embodiment of the present invention.

In particular, FIG. 13 is a diagram more specifically illustrating the UE of FIG. 12 above.

Referring to FIG. 13, the UE may be configured to include a processor (or a digital signal processor (DSP)) 1310, an RF module (or RF unit) 1335, a power management module 1305, an antenna 1340, a battery 1355, a display 1315, a keypad 1320, a memory 1330, a subscriber identification module (SIM) card 1325 (This component is optional), a speaker 1345, and a microphone 1350. The UE may also include a single antenna or multiple antennas.

The processor 1310 implements a function, a process, and/or a method which are proposed in FIGS. 1 to 11 above. Layers of a radio interface protocol may be implemented by the processor.

The memory 1330 is connected with the processor and stores information related with an operation of the processor. The memory 1330 may be positioned inside or outside the processor and connected with the processor by various well-known means.

A user inputs command information such as a telephone number or the like by, for example, pressing (or touching) a button on the keypad 1320 or by voice activation using the microphone 1350. The processor receives such command information and processes to perform appropriate functions including dialing a telephone number. Operational data may be extracted from the SIM card 1325 or the memory 1330. In addition, the processor may display command information or drive information on the display 1315 for the user to recognize and for convenience.

The RF module 1335 is connected with the processor to transmit and/or receive an RF signal. The processor transfers the command information to the RF module to initiate communication, for example, to transmit radio signals constituting voice communication data. The RF module is constituted by a receiver and a transmitter for receiving and transmitting the radio signals. The antenna 1340 functions to transmit and receive the radio signals. Upon receiving the radio signals, the RF module may transfer the signal for processing by the processor and convert the signal to a baseband. The processed signal may be converted into to audible or readable information output via the speaker 1345.

Figure 14:
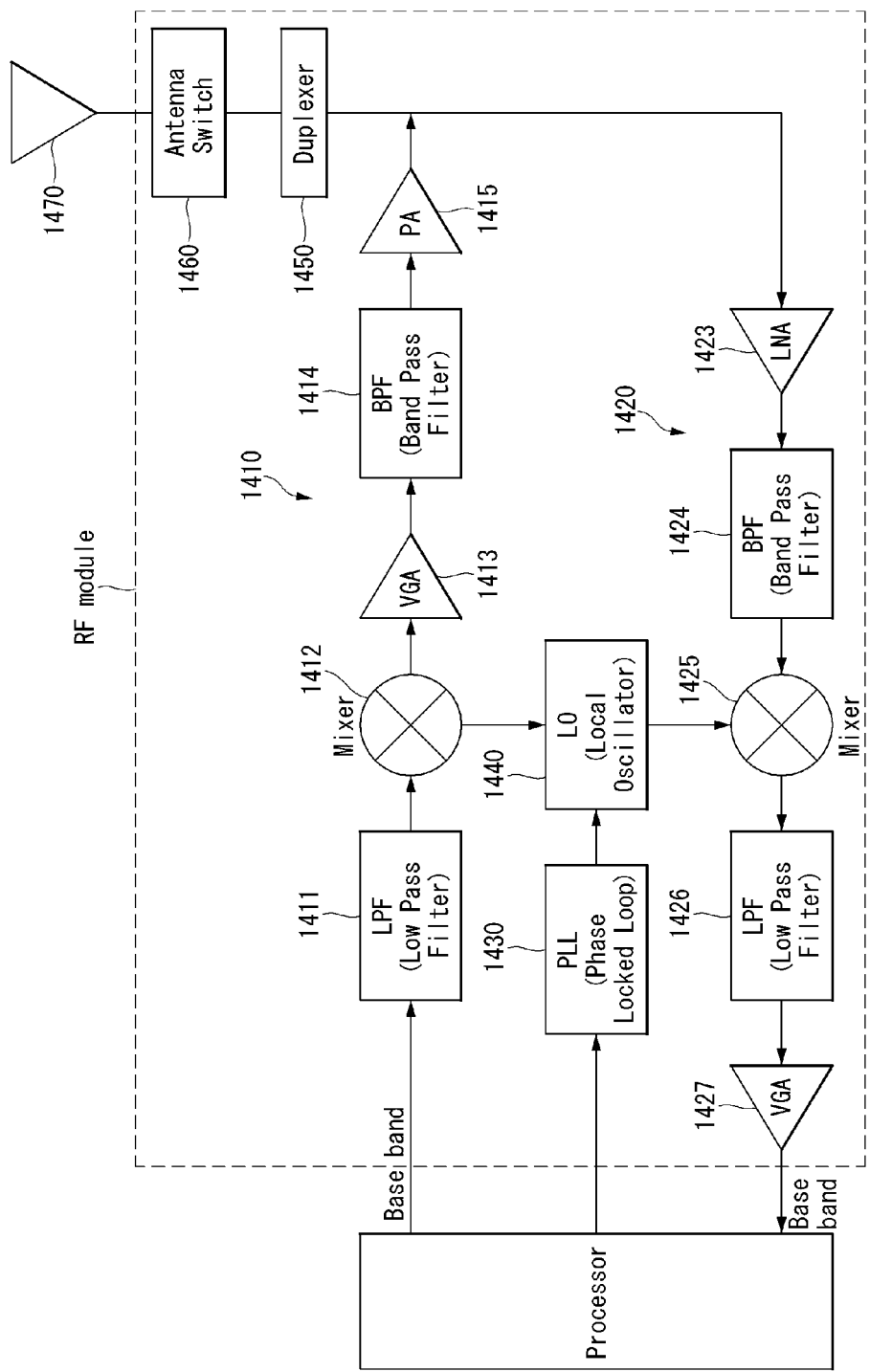
FIG. 14 is a diagram illustrating an example of an RF module of a wireless communication device to which the method proposed in this specification may be applied.

FIG. 14 is a diagram illustrating an example of an RF module of the wireless communication device to which the method proposed in this specification may be applied.

Specifically, FIG. 14 illustrates an example of an RF module that may be implemented in a frequency division duplex (FDD) system.

First, in a transmission path, the processors described in FIGS. 12 and 13 process the data to be transmitted and provide an analog output signal to the transmitter 1410.

Within the transmitter 1410, the analog output signal is filtered by a low pass filter (LPF) 1411 to remove images caused by a digital-to-analog conversion (ADC) and up-converted to an RF from a baseband by an up-converter (mixer) 1412, and amplified by a variable gain amplifier (VGA) 1413 and the amplified signal is filtered by a filter 1414, additionally amplified by a power amplifier (PA) 1415, routed through a duplexer(s) 1450/an antenna switch(es) 1660, and transmitted through an antenna 1470.

In addition, in a reception path, the antenna 1470 receives signals from the outside and provides the received signals, which are routed through the antenna switch(es) 1460/duplexers 1450 and provided to a receiver 1420.

In the receiver 1420, the received signals are amplified by a low noise amplifier (LNA) 1423, filtered by a bans pass filter 1424, and down-converted from the RF to the baseband by a down-converter (mixer) 1425.

The down-converted signal is filtered by a low pass filter (LPF) 1426 and amplified by a VGA 1427 to obtain an analog input signal, which is provided to the processors described in FIGS. 12 and 13.

Further, a local oscillator (LO) generator 1440 also provides transmitted and received LO signals to the up-converter 1412 and the down-converter 1425, respectively.

In addition, a phase locked loop (PLL) 1430 receives control information from the processor to generate the transmitted and received LO signals at appropriate frequencies and provides control signals to the LO generator 1440.

Further, circuits illustrated in FIG. 14 may be arranged differently from the components illustrated in FIG. 14.

Figure 15:
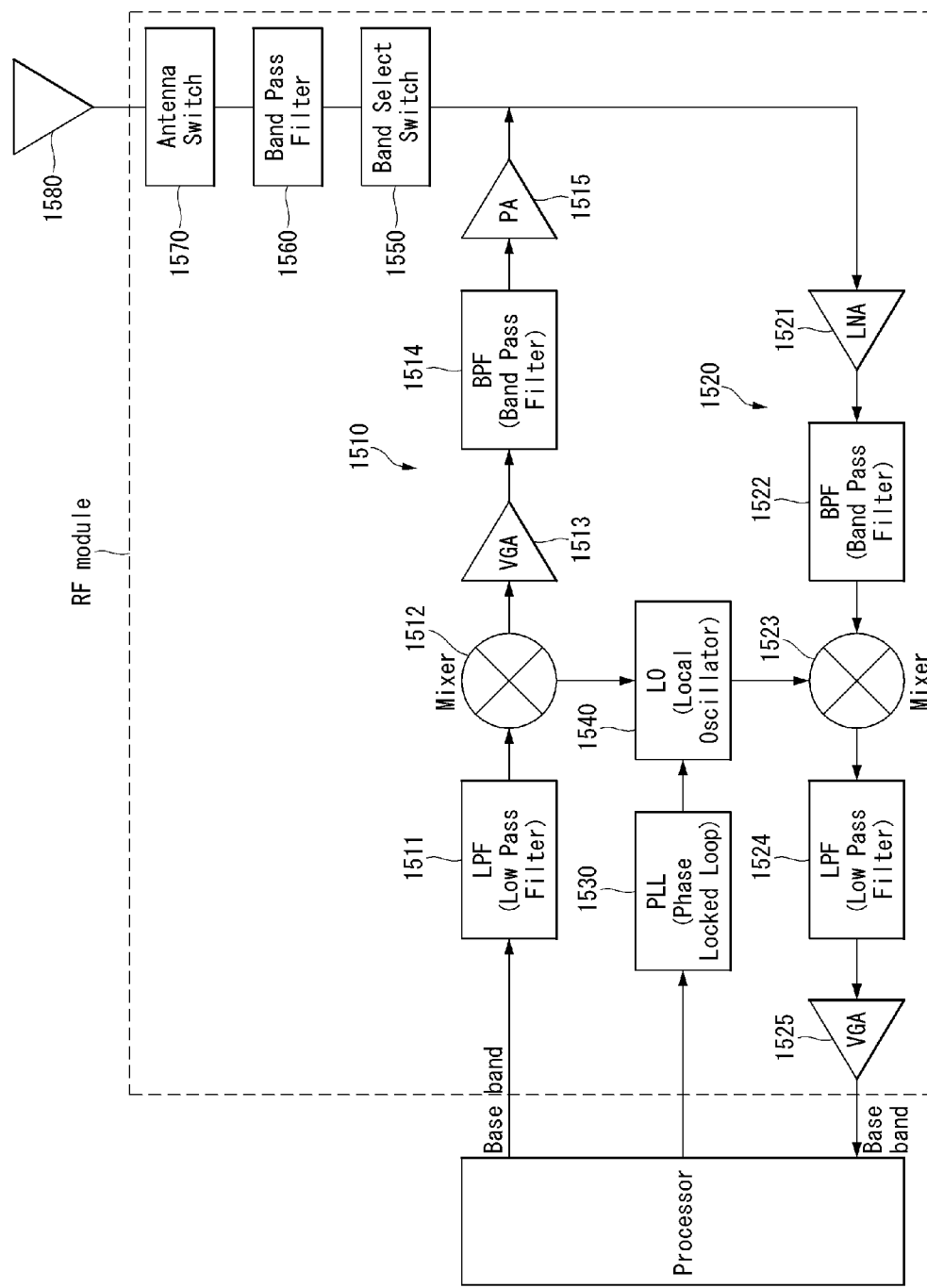
FIG. 15 is a diagram illustrating another example of the RF module of the wireless communication device to which the method proposed in this specification may be applied.

FIG. 15 is a diagram illustrating another example of the RF module of the wireless communication device to which the method proposed in this specification may be applied.

Specifically, FIG. 15 illustrates an example of an RF module that may be implemented in a time division duplex (TDD) system.

A transmitter 1510 and a receiver 1520 of the RF module in the TDD system are identical in structure to the transmitter and the receiver of the RF module in the FDD system.

Hereinafter, only the structure of the RF module of the TDD system that differs from the RF module of the FDD system will be described and the same structure will be described with reference to a description of FIG. 14.

A signal amplified by a power amplifier (PA) 1515 of the transmitter is routed through a band select switch 1550, a band pass filter (BPF) 1560, and an antenna switch(es) 1570 and transmitted via an antenna 1580.

In addition, in a reception path, the antenna 1580 receives signals from the outside and provides the received signals, which are routed through the antenna switch(es) 1570, the band pass filter 1560, and the band select switch 1550 and provided to the receiver 1520.

In the embodiments described above, the components and the features of the present invention are combined in a predetermined form. Each component or feature should be considered as an option unless otherwise expressly stated. Each component or feature may be implemented not to be associated with other components or features. Further, the embodiment of the present invention may be configured by associating some components and/or features. The order of the operations described in the embodiments of the present invention may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present invention may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present invention may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present invention may be embodied in other specific forms without departing from essential characteristics of the present invention. Accordingly, the aforementioned detailed description should not be construed as restrictive in all terms and should be exemplarily considered. The scope of the present invention should be determined by rational construing of the appended claims and all modifications within an equivalent scope of the present invention are included in the scope of the present invention.

An example is applied to the 3GPP LTE/LTE-A/NR system is described primarily, but it is possible to apply the RRC connection method to various wireless communication systems in addition to the 3GPP LTE/LTE-A/NR system.

What is claimed is:

1. A method for transmitting a sounding reference signal (SRS) in a wireless communication system, the method performed by a user equipment, the method comprising:
   receiving, from a base station (BS), resource configuration information for transmitting the SRS;
   performing carrier switching from a first component carrier (CC) to a second component carrier,
   wherein a subcarrier spacing of the first component carrier is different from a subcarrier spacing of the second component carrier, and
   wherein a carrier switching start position in the first component carrier is determined based on (i) a start position of a transmission symbol interval of the SRS and (ii) a carrier switching time; and
   transmitting, to the BS, the SRS on the second component carrier based on the resource configuration information.

2. The method of claim 1, wherein the first component carrier and the second component carrier are carriers having a time division duplexing (TDD) frame structure.

3. The method of claim 2, wherein a resource for transmitting the SRS is allocated in a subframe where both a subframe of the first component carrier and a subframe of the second component carrier are configured to be used for uplink transmission.

4. The method of claim 1, wherein a resource for transmitting the SRS is allocated to a specific time resource region of the first component carrier, and
   one or more mini-slots are configured in at least one of a front portion or a rear portion of the specific time resource region.

5. The method of claim 4, wherein the resource configuration information further includes information indicating a time resource position of the one or more mini-slots configured in the first component carrier.

6. The method of claim 4, wherein when a physical uplink shared channel (PUSCH) demodulation reference signal (DMRS) symbol and the specific time resource region overlap with each other on the first component carrier, the transmission of the SRS is dropped on the second component carrier.

7. The method of claim 6, wherein the PUSCH DMRS symbol includes an additional DMRS symbol.

8. The method of claim 1, wherein a carrier switching end position in the first component carrier is determined based on (i) an end position of the transmission symbol interval of the SRS and (ii) the carrier switching time.

9. The method of claim 1, the subcarrier spacing of the second component carrier is larger than the subcarrier spacing of the second component carrier.

10. A user equipment configured to transmit a sounding reference signal (SRS) in a wireless communication system, the user equipment comprising:
    a receiver and a transmitter;
    at least one processor; and
    at least one computer memory operably connectable to the at least one processor and storing instructions that, when executed by the at least one processor, perform operations comprising:
    receiving, from a base station (BS) through the receiver, resource configuration information for transmitting the SRS;
    performing carrier switching from a first component carrier (CC) to a second component carrier,
    wherein a subcarrier spacing of the first component carrier is different from a subcarrier spacing of the second component carrier, and
    wherein a carrier switching start position in the first component carrier is determined based on (i) a start position of a transmission symbol interval of the SRS and (ii) a carrier switching time; and
    transmitting, through the transmitter, the SRS to the BS on the second component carrier based on the resource configuration information.

11. The user equipment of claim 10, wherein a resource for transmitting the SRS is allocated to a specific time resource region of the first component carrier, and
    one or more mini-slots are configured in at least one of a front portion or a rear portion of the specific time resource region.

12. The user equipment of claim 11, wherein the resource configuration information further includes information indicating a time resource position of the one or more mini-slots configured in the first component carrier.

13. The user equipment of claim 11, wherein when a physical uplink shared channel (PUSCH) demodulation reference signal (DMRS) symbol and the specific time resource region overlap with each other on the first component carrier, the transmission of the SRS is dropped on the second component carrier.

14. The user equipment of claim 10, wherein a carrier switching end position in the first component carrier is determined based on (i) an end position of the transmission symbol interval of the SRS and (ii) the carrier switching time.

15. An apparatus configured to control a user equipment to transmit a sounding reference signal (SRS) in a wireless communication system, the apparatus comprising:
    at least one processor; and
    at least one computer memory operably connectable to the at least one processor and storing instructions that, when executed by the at least one processor, perform operations comprising:
    receiving, from a base station (BS), resource configuration information for transmitting the SRS;

performing carrier switching from a first component carrier (CC) to a second component carrier,
wherein a subcarrier spacing of the first component carrier is different from a subcarrier spacing of the second component carrier, and
wherein a carrier switching start position in the first component carrier is determined based on (i) a start position of a transmission symbol interval of the SRS and (ii) a carrier switching time; and
transmitting the SRS to the BS on the second component carrier based on the resource configuration information.

16. The apparatus of claim 15, wherein the first component carrier and the second component carrier are carriers having a time division duplexing (TDD) frame structure.

17. The apparatus of claim 15, wherein a resource for transmitting the SRS is allocated to a specific time resource region of the first component carrier, and
one or more mini-slots are configured in at least one of a front portion or a rear portion of the specific time resource region.

18. The apparatus of claim 17, wherein the resource configuration information further includes information indicating a time resource position of the one or more mini-slots configured in the first component carrier.

19. The apparatus of claim 17, wherein when a physical uplink shared channel (PUSCH) demodulation reference signal (DMRS) symbol and the specific time resource region overlap with each other on the first component carrier, the transmission of the SRS is dropped on the second component carrier.

20. The apparatus of claim 19, wherein the PUSCH DMRS symbol includes an additional DMRS symbol.

* * * * *